(12) United States Patent
Shao et al.

(10) Patent No.: US 12,352,587 B2
(45) Date of Patent: Jul. 8, 2025

(54) METHODS FOR DETERMINING GARBAGE SWEEPING POINTS IN SMART CITIES AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Lei Zhang, Chengdu (CN); Xiaojun Wei, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 311 days.

(21) Appl. No.: 18/174,638

(22) Filed: Feb. 26, 2023

(65) Prior Publication Data
US 2023/0213347 A1    Jul. 6, 2023

(30) Foreign Application Priority Data
Dec. 16, 2022    (CN) .......................... 202211621724.9

(51) Int. Cl.
*G01C 21/34*    (2006.01)
*A47L 11/40*    (2006.01)
*G05D 1/00*    (2006.01)

(52) U.S. Cl.
CPC ...... *G01C 21/3461* (2013.01); *A47L 11/4061* (2013.01); *G05D 1/0022* (2013.01)

(58) Field of Classification Search
CPC .............. G01C 21/3461; G01C 21/343; A47L 11/4061; A47L 2201/06; A47L 11/4011; G05D 1/0022; G05D 1/0282
See application file for complete search history.

(56) References Cited

U.S. PATENT DOCUMENTS

| 11,702,280 B2* | 7/2023 | Kurani ................... G06Q 10/08 705/308 |
| 2009/0268026 A1* | 10/2009 | Mori ..................... G06V 20/588 348/148 |

(Continued)

FOREIGN PATENT DOCUMENTS

| CN | 111414926 A | * | 7/2020 |
| CN | 112115968 A | * | 12/2020 | ............. G06F 18/24 |

(Continued)

OTHER PUBLICATIONS

D. Patel, F. Patel, S. Patel, N. Patel, D. Shah and V. Patel, "Garbage Detection using Advanced Object Detection Techniques," 2021 International Conference on Artificial Intelligence and Smart Systems (ICAIS), Coimbatore, India, 2021, pp. 526-531, doi: 10.1109/ICAIS50930.2021.9395916.keywords: {Waste management;Ob.*

*Primary Examiner* — Redhwan K Mawari
(74) *Attorney, Agent, or Firm* — Metis IP LLC

(57) ABSTRACT

The present disclosure provides a method for determining a garbage sweeping point in a smart city and an Internet of Things system. The method is implemented by the Internet of Things system. The method includes a user platform, a service platform, a management platform, a sensor network platform, and an object platform. The method is performed through the management platform and includes: obtaining monitoring information on at least one road within a road network area, identifying a target object on the at least one road, the target object including at least garbage to be processed; determining, based on an identification result, information related to the target object, the information related to the target object including at least a garbage volume of the garbage to be processed; and determining at least one target garbage sweeping point based on the information related to the target object.

6 Claims, 9 Drawing Sheets

(56) References Cited

U.S. PATENT DOCUMENTS

| | | | |
|---|---|---|---|
| 2011/0077848 A1* | 3/2011 | Xiao | G01C 21/343 |
| | | | 701/532 |
| 2012/0084000 A1* | 4/2012 | Wang | G06F 16/587 |
| | | | 701/426 |
| 2016/0300297 A1 | 10/2016 | Kekalainen et al. | |
| 2019/0360822 A1 | 11/2019 | Rodoni et al. | |
| 2021/0024068 A1* | 1/2021 | Lacaze | G05D 1/0088 |
| 2021/0049559 A1 | 2/2021 | Kilburn | |
| 2021/0188541 A1* | 6/2021 | Kurani | B65F 1/14 |
| 2022/0204259 A1 | 6/2022 | Moore et al. | |
| 2022/0316892 A1* | 10/2022 | Takanohashi | G01C 21/3676 |
| 2023/0260067 A1 | 8/2023 | Payette et al. | |
| 2023/0278544 A1* | 9/2023 | Wendt | B62J 27/00 |
| | | | 701/1 |
| 2024/0092567 A1 | 3/2024 | Subramaniam et al. | |

FOREIGN PATENT DOCUMENTS

| | | | |
|---|---|---|---|
| CN | 212502216 U | * | 2/2021 |
| CN | 114386690 A | * | 4/2022 |

* cited by examiner

200

┌─────────────────────────────────────────────────────┐
│ Obtaining monitoring information on at least one road │ ─── 210
│ within a road network area, and identifying a garbage │
│ accumulation on the at least one road                 │
└─────────────────────────────────────────────────────┘
                          │
                          ▼
┌─────────────────────────────────────────────────────┐
│ Determining at least one target garbage sweeping point│ ─── 220
│ based on the garbage accumulation                    │
└─────────────────────────────────────────────────────┘
                          │
                          ▼
┌─────────────────────────────────────────────────────┐
│ Determining a garbage sweeping route based on at     │ ─── 230
│ least one target garbage sweeping point              │
└─────────────────────────────────────────────────────┘

┌─────────────────────────────────────────────────┐  ─ 310
│ Obtaining the monitoring information on the at least one │
│ road within the road network area and determining flow │
│ information on the at least one road │
└─────────────────────────────────────────────────┘

▼

┌─────────────────────────────────────────────────┐  ─ 320
│ Determining the at least one target garbage sweeping │
│ point based on the garbage accumulation and flow │
│ information │
└─────────────────────────────────────────────────┘

610 — Obtaining monitoring information on at least one road within a road network area, and identifying a target object on the at least one road 620 — Determining, based on an identification result, information related to the target object 630 — Determining at least one target garbage sweeping point based on the information related to the target object

Determining the at least one road with the garbage volume meeting a predetermined condition as at least one candidate garbage sweeping point — 810

Determining the at least one target garbage sweeping point based on the at least one candidate garbage sweeping point — 820

FIG. 8

METHODS FOR DETERMINING GARBAGE SWEEPING POINTS IN SMART CITIES AND INTERNET OF THINGS SYSTEMS THEREOF

CROSS-REFERENCE TO RELATED APPLICATIONS

This application claims priority of Chinese Patent Application No. 202211621724.9, filed on Dec. 16, 2022, the contents of which are hereby incorporated by reference to its entirety.

TECHNICAL FIELD

This present disclosure relates to the field of garbage cleaning technology, and in particular, to a method for determining a garbage sweeping point in a smart city and an Internet of Things system thereof.

BACKGROUND

Garbage sweeping in cities is an important part of city governance. Before sweeping the road, the garbage on the road increases with time. Due to the limitation of human and material resources, it is difficult for sweepers to sweep the garbage on all roads at all times. When there is more than a certain amount of garbage on the road, a greater impact on pedestrians may generate.

Therefore, it is expected to propose a method for determining a garbage sweeping point in a smart city and an Internet of Things (IoT) system, which can timely clean the roads where garbage has a high impact on pedestrians and maintain a good living environment.

SUMMARY

One of the embodiments of the present disclosure provides a method for determining a garbage sweeping point in a smart city. The method comprises obtaining monitoring information on at least one road within a road network area, identifying a target object on the at least one road, the target object including at least garbage to be processed; determining, based on an identification result, information related to the target object, the information related to the target object including at least a garbage volume of the garbage to be processed; and determining at least one target garbage sweeping point based on the information related to the target object.

One of the embodiments of the present disclosure provides an Internet of Things system for determining a garbage sweeping point in a smart city. The system comprises: a user platform, a service platform, a management platform, a sensor network platform and an object platform. The service platform is used to send at least one target garbage sweeping point to the user platform. The object platform is used to obtain monitoring information on at least one road within a road network area and transmit the monitoring information to the management platform via the sensor network platform. The management platform is used to obtain the monitoring information on the at least one road within the road network area, identify a target object on the at least one road, the target object including at least garbage to be processed; determine, based on an identification result, information related to the target object, the information related to the target object including at least a garbage volume of the garbage to be processed; determine the at least one target garbage sweeping point based on the information related to the target object; generate a remote control instruction and send the remote control instruction to the sensor network platform based on the at least one target garbage sweeping point; and send the remote control instruction to the object platform based on the sensor network platform to cause the object platform to perform a sweeping operation.

One of the embodiments of the present disclosure provides a non-transitory computer-readable storage medium, comprising a set of instructions, when executed by a processor, the above method for determining a garbage sweeping point in a smart city is implemented.

BRIEF DESCRIPTION OF THE DRAWINGS

This description will be further explained in the form of exemplary embodiments, which will be described in detail by means of accompanying drawings. These embodiments are not restrictive, in which the same numbering indicates the same structure, wherein:

FIG. 2 is a flowchart illustrating an exemplary method for planning a garbage sweeping route in a smart city according to some embodiments of the present disclosure;

FIG. 3 is a flowchart illustrating an exemplary process for determining at least one target garbage sweeping point according to some embodiments of the present disclosure;

FIG. 6 is a flowchart illustrating an exemplary process for determining a garbage sweeping point in a smart city according to some embodiments of the present disclosure;

FIG. 8 is another flowchart illustrating an exemplary process for determining at least one target garbage sweeping point according to some embodiments of the present disclosure;

DETAILED DESCRIPTION

Figure 1:
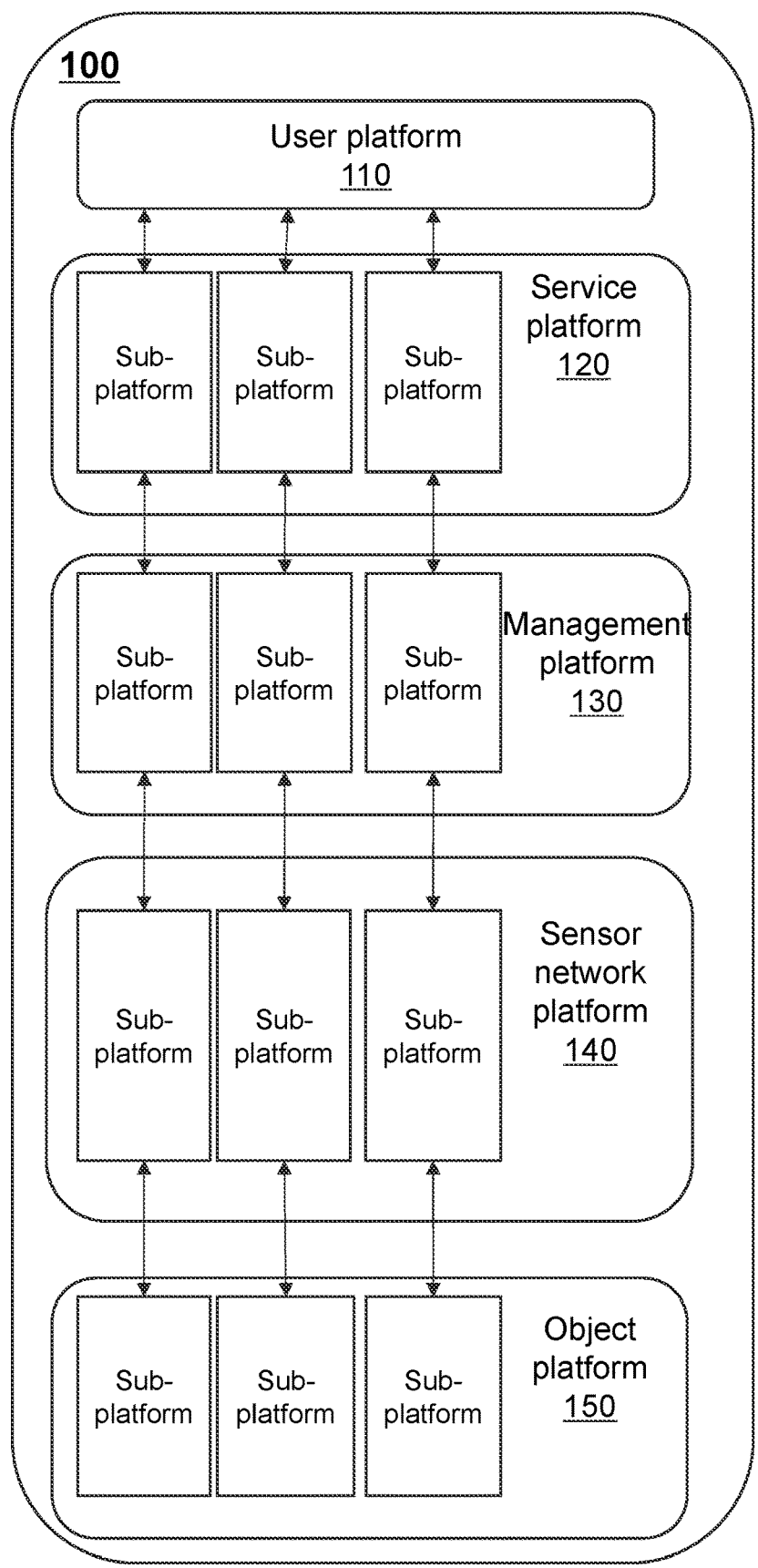
FIG. 1 is a schematic diagram illustrating an exemplary Internet of Things (IoT) system for garbage sweeping in a smart city according to some embodiments of the present disclosure.

In order to more clearly explain the technical scheme of the embodiments of this disclosure, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

It should be understood that the "system", "device", "unit" and/or "module" used in this disclosure are a method used to distinguish different components, elements, parts, portions or assemblies of different levels. However, if other words may achieve the same purpose, the words may be replaced by other expressions.

As shown in this description and claims, the words "one", "a", "a kind" and/or "the" are not special singular but may include the plural unless the context expressly suggests otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

Flowcharts are used in this description to illustrate the operation implemented by the system according to the embodiments of this description. It should be understood that the foregoing or following operations may not be necessarily performed exactly in order. Instead, the operations may be processed in reverse order or simultaneously. Besides, one or more other operations may be added to these processes, or one or more operations may be removed from these processes.

FIG. 1 is a schematic diagram illustrating an exemplary Internet of Things (IoT) system for garbage sweeping in a smart city according to some embodiments of the present disclosure. In some embodiments, the Internet of Things system 100 for garbage sweeping in the smart city includes a user platform 110, a service platform 120, a management platform 130, a sensor network platform 140, and an object platform 150. The Internet of Things (IoT) system for the garbage sweeping in the smart city may include an IoT system for planning a garbage sweeping route in a smart city, an IoT system for determining a garbage sweeping point in a smart city, etc. The IoT system for planning the garbage sweeping route in the smart city is mainly used to determine a route planning for garbage sweeping. The IoT system for determining the garbage sweeping point in the smart city is mainly used to determine the garbage sweeping point.

In some embodiments, the processing of information in the IoT may be divided into a processing process for perceptual information and a processing process for control information, and the control information may be information generated based on the perceptual information. The perceptual information may be obtained by the user platform 110 and may be transmitted to the management platform 130. The control information may be distributed from the management platform 130 to the user platform 110, which in turn enables the corresponding control.

The user platform 110 is a platform that may be used to interact with a user. In some embodiments, the user platform 110 may be configured as a terminal device. For example, the terminal device may include a mobile device, a tablet computer, or the like, or any combination thereof. In some embodiments, the user platform 110 may be used to provide feedback to the user on a route planning and/or a garbage sweeping point for garbage sweeping in various road network areas of the city. In some embodiments, the user platform 110 may interact with the service platform 120 in both directions. The user platform 110 may send a route planning and/or a garbage sweeping point query instruction for garbage sweeping to the service platform 120, and receive the route planning and/or the garbage sweeping point for garbage sweeping uploaded by the service platform 120.

The service platform 120 is a platform that may be used to receive and transmit data and/or information. In some embodiments, the service platform 120 may be provided with the plurality of sub-platforms according to the division of the city road network area, and each sub-platform may correspond to at least one city road network area. In some embodiments, the service sub-platform in each road network area of the city may independently receive instructions from the user platform 110 and independently feed back the route planning and/or garbage sweeping point for garbage sweeping in the city road network area corresponding to the service sub-platform, etc. In some embodiments, the sub-platform corresponding to each city road network area in the service platform 120 may independently interact with a sub-platform corresponding to the city road network area in the management platform 130 in a two-way manner, send the route planning and/or garbage sweeping point query instruction to the management sub-platform, and receive the route planning and/or garbage sweeping point uploaded by the management sub-platform for garbage sweeping.

The management platform 130 may refer to a platform that harmonizes and coordinates the linkage and collaboration between functional platforms, brings all the information of the Internet of Things together, and provides perceptual management and control management functions for the operation system of the Internet of Things. In some embodiments, the management platform 130 may be used to perform the method for planning the garbage sweeping route in the smart city and/or the method for determining the garbage sweeping point in the smart city, and in response to a query demand from a user, process monitoring information on at least one road within the road network area uploaded by the sensor network platform 140 to determine a garbage sweeping route and/or at least one target garbage sweeping point.

In some embodiments, the management platform 130 may be provided with at least one sub-platform according to the city road network area, and each management sub-platform may correspond to a service sub-platform of a corresponding city road network area. In some embodiments, each management sub-platform may obtain the monitoring information from the sensor network sub-platform of the corresponding road network area and process the monitoring information, and send the route planning and/or garbage sweeping point for garbage sweeping obtained after processing to the service sub-platform of the corresponding area. In some embodiments, each sub-platform of the management platform 130 may independently interact with each sub-platform of the corresponding road network area in the sensor network platform 140 in a two-way manner, receive the monitoring information of each road network area uploaded by the sensor network sub-platform for processing, and issue instructions for obtaining the monitoring information to the sensor network sub-platform.

In some embodiments of the present disclosure, the monitoring information of different road network areas is processed by the management sub-platforms, which can reduce the data processing pressure of the whole management platform, at the same time, the route planning and/or garbage sweeping point for garbage sweeping when each road network area of the city independently manages the each road network area is determined in a more targeted manner.

The sensor network platform 140 may be a functional platform for the management of sensor communications. The sensor network platform 140 may be configured as a communication network and gateway to perform functions such as network management, protocol management, instruction management, and data parsing. In some embodiments, the sensor network platform 140 may be provided with at least one sub-platform according to the division of the city road network area, each sensor network sub-platform may correspond to the sub-platform in the management platform 130, and the communication network and gateway may be independently configured for each sensor network sub-platform. In some embodiments, each sub-platform of the sensor network platform 140 may interact with the sub-platform of the corresponding city road network area in the object platform 150 in a two-way manner, receive the monitoring information uploaded by the object sub-platform of the corresponding area, and issue the instructions for obtaining the monitoring information to the object sub-platform of the corresponding area.

The object platform 150 is a functional platform that may generate the perceptual information. In some embodiments, the object platform 150 may be configured as a monitoring device (e.g., a camera device, etc.), and the monitoring device may be provided with a unique identification that may be deployed in communities in different city road network areas of the city for management. In some embodiments, the object platform 150 may be provided with at least one sub-platform according to the division of the city road network area, and each sub-platform may correspond to the sub-platform in the sensor network platform 140. In some embodiments, each sub-platform configured as the monitoring device with the unique identification of the object platform 150 may obtain the monitoring information of the city road network area and upload the monitoring information to the sensor network sub-platform of the corresponding area.

As shown in FIG. 1, in the IoT system 100 for the garbage sweeping in the smart city, the "service sub-platform—management sub-platform—sensor network sub-platform—object sub-platform" in each city area are independent branches that process monitoring information independently and in parallel and feed the information back to the user platform 110 independently.

It should be noted that the above descriptions of the IoT system and components are for descriptive convenience only and do not limit the present disclosure to the scope of the cited embodiments. It should be understood that it is possible for those skilled in the art, with an understanding of the principle of the IoT system, to make any combination of the components or to form subsystems to connect to other components without departing from the principle. For example, the management platform 130 may be integrated in one component. As another example, the components may share a common storage device, or each component may have its own storage device. Variants such as these are within the scope of protection of the present disclosure.

FIG. 2 is a flowchart illustrating an exemplary method for planning a garbage sweeping route in a smart city according to some embodiments of the present disclosure. As shown in FIG. 2, a process 200 includes the following steps. In some embodiments, the process 200 may be executed by the management platform.

Step 210, obtaining monitoring information on at least one road within a road network area, and identifying a garbage accumulation on the at least one road.

The road network area refers to a road nets region consisting of various roads that are interconnected and intertwined into a network distribution, for example, a highway network area consisting of highways and a city road network area consisting of various roads within city. A city may be divided into several road network areas according to actual needs.

The monitoring information is monitoring and control information on the road. For example, the monitoring information may include information about garbage on the road, information about pedestrians on the road, information about vehicles on the road, etc.

In some embodiments, the management platform may obtain the monitoring information based on a monitoring device. For example, the monitoring device may be a camera, etc.

The garbage accumulation is a situation related to garbage gathering in piles on different roads. For example, the garbage accumulation may be expressed by a garbage volume (e.g., less, average, excessive, etc.), an accumulation level (e.g., level 1, level 2, level 3, etc.), and a number of garbage accumulations (1, 3, 5, etc.). The higher the garbage volume is and/or the higher the accumulation level is, and/or the higher the number of the garbage accumulations is, the more serious the garbage accumulation on the road may be.

In some embodiments, the management platform may identify the garbage accumulation on at least one road based on a first preset condition. The first preset condition may be a pre-set condition related to limiting the garbage accumulation on the road. For example, the first preset condition may be a range of garbage accumulation.

Exemplarily, the range of garbage accumulation not more than 1 square meter is less and/or level 1, the range of garbage accumulation greater than 1 square meter but not more than 2 square meters is average and/or level 2, the range of garbage accumulation more than 2 square meters is excessive and/or level 3, etc.

As another example, the first preset condition may be a height of the garbage accumulation. Exemplarily, the height of garbage accumulation not exceeding 0.2 m is less and/or level 1, the height of garbage accumulation greater than 0.2 m but not exceeding 0.5 m is average and/or level 2, the height of garbage accumulation exceeding 0.5 m is excessive and/or level 3, etc.

As another example, the first preset condition may be the number of garbage accumulations. For example, the number of garbage accumulation being one is less and/or level 1, the number of garbage accumulations greater than one but not more than three is average and/or level 2, the number of garbage accumulations greater than three is excessive and/or level 3, etc.

For example, based on the monitoring information on road 1 showing that the range of garbage accumulation on road 1 at location A is more than 2 square meters, or the height of garbage accumulation is more than 0.5 meters, or the number of garbage accumulations is more than 3, the management platform may identify the garbage accumulation on road 1 at location A as excessive and/or level 3.

As another example, based on the monitoring information on road 2 showing that the garbage accumulation on road 2 at location B does not exceed 1 square meter, or the height of the garbage accumulation does not exceed 0.2 meters, or the number of garbage accumulation is 1, the management platform may identify the garbage accumulation on road 2 at location B as less and/or level 1, etc.

Step 220, determining at least one target garbage sweeping point based on the garbage accumulation.

The target garbage sweeping point is a road where garbage needs to be processed. For example, the target garbage sweeping point may be a road with a garbage accumulation level of 2, 3, etc.

In some embodiments, the management platform may determine the target garbage sweeping point based on a first preset threshold. The first preset threshold is a pre-set value for the range of garbage accumulation. For example, the first preset threshold is 2 square meters, and the management platform may identify road 1 as a target garbage sweeping point when the garbage accumulation (e.g., the garbage volume) on road 1 at location A is greater than the first preset threshold of 2 square meters.

In some embodiments, the management platform may preset a garbage accumulation comparison table and determine which road is the targeted garbage sweeping point by checking the table. The garbage accumulation comparison table includes different rules for determining the target garbage sweeping point corresponding to different roads. For example, when the garbage accumulation on road 1 at location A in the garbage accumulation comparison table is more than average, road 1 may be the target garbage sweeping point. As another example, the management platform may identify road 1 as the target garbage sweeping point when the garbage accumulation on road 1 is more than average.

For more information about the determining the target garbage sweeping point, please refer to FIG. 3 and the related description thereof.

Step 230, determining a garbage sweeping route based on at least one target garbage sweeping point.

The garbage sweeping route is a route planning for sweeping the garbage from all target garbage sweeping points. For example, the garbage sweeping route may be a shortest route that passes through and sweeps the garbage from all target garbage sweeping points in sequential order.

In some embodiments, the management platform may determine the garbage sweeping route based on the at least one target garbage sweeping point through a sweeping route determination model. The sweeping route determination model may be a machine learning model. In some embodiments, an input of the sweeping route determination model may be the at least one target garbage sweeping point and an output of the sweeping route determination model may be the garbage sweeping route.

The parameters of the sweeping route determination model may be obtained by training. In some embodiments, the sweeping route determination model may be obtained by training a plurality of groups of sweeping route training samples with sweeping route labels. For example, the plurality of groups of sweeping route training samples with sweeping route labels may be input into an initial sweeping route determination model, a loss function may be constructed based on the sweeping route labels and output results of the initial sweeping route determination model, and the parameters of the sweeping route determination model may be updated iteratively based on the loss function. The training of the model may be completed when the loss function of the initial sweeping route determination model meets setting requirements, and a trained sweeping route determination model may be obtained. The setting requirements may be that the loss function converges, the number of iterations reaches a threshold, etc.

In some embodiments, each group of sweeping route training samples may include historical target garbage sweeping points on each road. Each group of sweeping route labels may be actual garbage sweeping route corresponding to each group of sweeping route training samples. In some embodiments, the sweeping route training samples may be obtained based on the historical target garbage sweeping points, and the sweeping route labels may be obtained by manual labeling.

Figure 5:
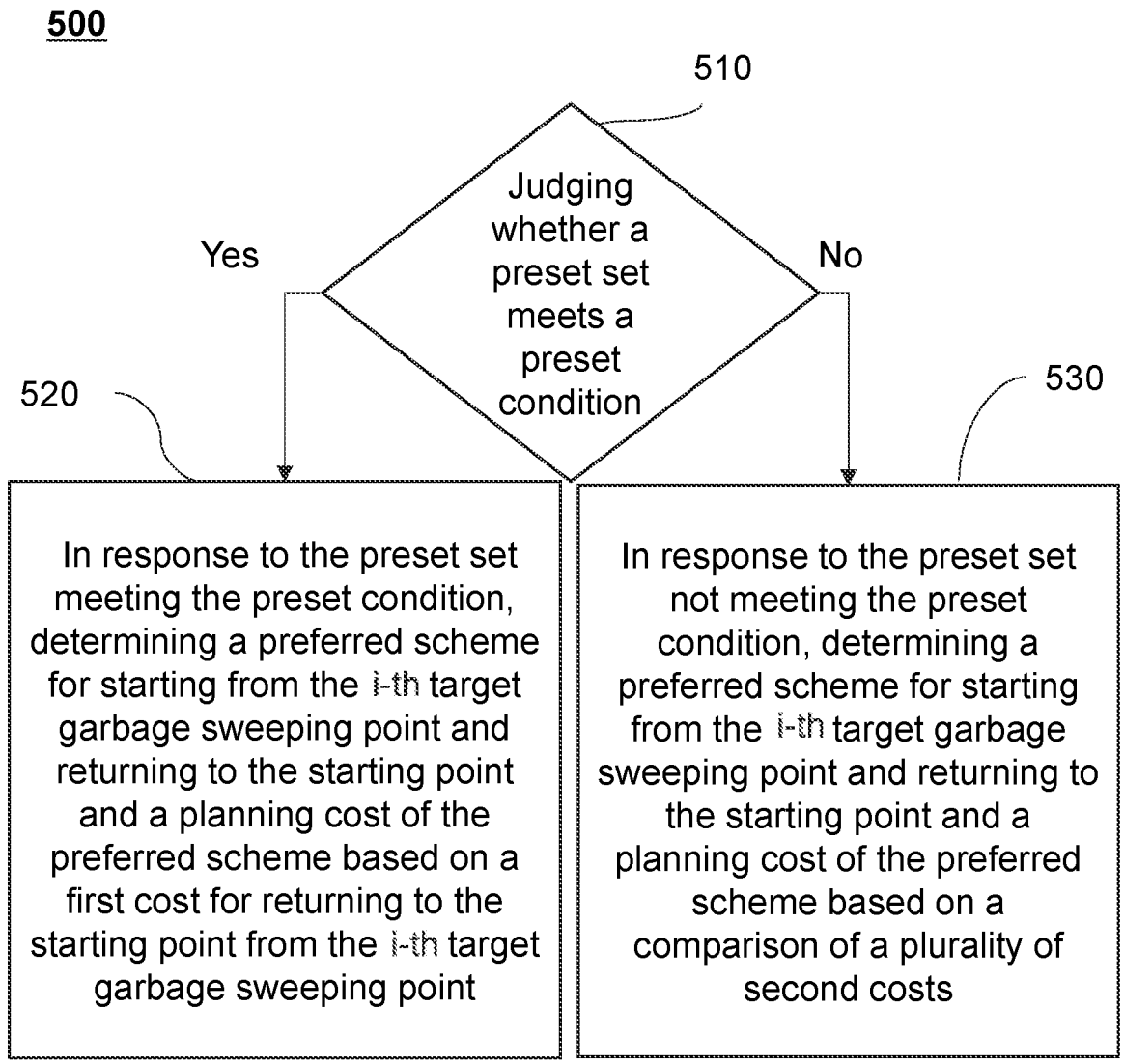
FIG. 5 is a flowchart illustrating an exemplary process for determining a garbage sweeping route according to some embodiments of the present disclosure.

For more information about determining the garbage sweeping route, please refer to FIG. 5 and the related description thereof.

As described in some embodiments of the present disclosure, by obtaining monitoring information on the road in the road network area and identifying the garbage accumulation on the road, the garbage accumulation can be obtained in real time. Based on the garbage accumulation, the target garbage sweeping point is obtained and the garbage sweeping route is determined, which can adjust the garbage sweeping route according to the garbage accumulation in real time, improve the road sweeping route, reduce repeated sweeping, and effectively save manpower and material resources.

In some embodiments, the management platform may generate a remote control instruction and send the remote control instruction to the sensor network platform based on the garbage sweeping route.

The remote control instruction is a control instruction generated remotely by the computer through operation. In some embodiments, the remote control instruction may be automatically generated based on the garbage sweeping route through the IoT system for planning the garbage sweeping route in the smart city. For example, the garbage sweeping route is A-B-C-D, and the remote control instruction 1 is automatically generated; the garbage sweeping route is A-C-D-B, the remote control instruction 2 is automatically generated, etc.

In some embodiments, the management platform may send the remote control instruction to the object platform based on the sensor network platform to cause the object platform to perform a sweeping operation.

The sweeping operation is an operation related to sweeping and cleaning the garbage. For example, the sweeping operation may be sweeping up garbage, flushing roads, etc. In some embodiments, the object platform may perform the sweeping operation based on the remote control instruction. For example, the sweeping operation of the remote control instruction 1 may be to sweep the garbage first and then flush the road, and the sweeping operation of the remote control instruction 2 may be to flush the road first and then sweep the garbage, etc.

By generating a remote control instruction to perform a sweeping operation based on a garbage sweeping route as described in some embodiments of the present disclosure, the sweeping operation can be performed in a targeted manner according to the garbage sweeping route to improve the efficiency of garbage sweeping.

FIG. 3 is a flowchart illustrating an exemplary process for determining at least one target garbage sweeping point according to some embodiments of the present disclosure. As shown in FIG. 3, a process 300 includes the following steps. In some embodiments, the process 300 may be performed by the management platform.

Step 310, obtaining the monitoring information on the at least one road within the road network area and determining flow information on the at least one road.

The flow information is a number of objects flowing through the road in a time unit. For example, the flow information may be a number of vehicles or pedestrians passing through the road in a unit time. The flow information may include a pedestrian flow. The flow information may also include a traffic flow, etc. For more information about the traffic flow, please refer to FIG. 4 and the related description thereof.

In some embodiments, the management platform may use algorithms to determine the flow information on the road based on the monitoring information on the road within the road network area. For example, the management platform may obtain the flow information on the road in real time by detecting and identifying objects of different shapes in the monitoring information (e.g., video images) through algorithms, such as contour recognition, dynamic video tracking, stereo vision, etc.

The pedestrian flow is a number of people passing through the road per unit time. For example, the number of people passing through road 3 from 8:00 a.m. to 9:00 a.m. is 780. Road 3 has a pedestrian flow of 13 people/minute in this time period. In some embodiments, the management platform may use video algorithms to determine the pedestrian flow on the road based on the monitoring information on the road within the road network area. In some embodiments, the management platform may determine the pedestrian flow on the road based on a wireless visit access point. For example, WiFi probes may be used to identify the device information of passers-by to determine the pedestrian flow on the road.

In some embodiments, the flow information may also include a predicted pedestrian flow on each of the at least one road at a future moment.

The predicted pedestrian flow is a predicted number of people likely to pass through the road at a future moment. The future moment may be a moment that is some time away from the current time point. For example, the future moment may refer to a moment that is half an hour or an hour from the current point time, etc. In some embodiments, the management platform may determine the predicted pedestrian flow through a pedestrian flow prediction model based on historical pedestrian flows on each road at a plurality of historical moments. Different roads or the same road at different future moments may correspond to different pedestrian flows.

The historical pedestrian flow is an amount of people passing on the road at historical moments. The historical moment may refer to a moment that corresponds to the future moment. For example, the future moment is 9:00, and the historical moment is 9:00 corresponding to a past time period (e.g., a week, half a month, a month, etc.). As another example, if the current moment is 8:00 and the future moment is 9:00, the historical moment may be a moment of the same day, such as 6:00, 6:10, 6:20, . . . , 7:50, 8:00, etc. For more information about determining the historical pedestrian flow on a road, please refer to the description of determining the pedestrian flow above.

The pedestrian flow prediction model may be used to predict the predicted pedestrian flow on each road at the future moment. The pedestrian flow prediction model may be a machine learning model. For example, the pedestrian flow prediction model may be a Convolutional Neural Network (CNN) model, a Long short-term memory (LSTM) model, etc.

In some embodiments, the input of the pedestrian flow prediction model may be the historical pedestrian flows on a certain road at the plurality of historical moments corresponding to the future moment, and the output of the pedestrian flow prediction model may be the predicted pedestrian flow on the certain road at the future moment.

The parameters of the pedestrian flow prediction model may be obtained by training. In some embodiments, the pedestrian flow prediction model may be obtained by training a plurality of groups of pedestrian flow training samples with pedestrian flow labels. For example, the plurality of groups of pedestrian flow training samples with pedestrian flow labels may be input to an initial pedestrian flow prediction model, and the loss function may be constructed based on the pedestrian flow labels and output results of the initial pedestrian flow prediction model, and the parameters of the pedestrian flow prediction model may be updated iteratively based on the loss function. The training of the model may be completed when the loss function of the initial pedestrian flow prediction model meets the setting requirements, and the trained pedestrian flow prediction model may be obtained. The setting requirements may be that the loss function converges, the number of iterations reaches a threshold, etc.

In some embodiments, each group of pedestrian flow training samples may include historical pedestrian flows on each road of the sample at the plurality of historical moments corresponding to the future moment. Each group of pedestrian flow labels may be the actual pedestrian flow at the future moment corresponding to each group of pedestrian flow training samples. In some embodiments, the pedestrian flow training samples may be obtained based on historical pedestrian flows, and the pedestrian flow labels may be obtained by manual labeling.

In some embodiments of the present disclosure, the predicted pedestrian flow may be determined through the pedestrian flow prediction model based on the historical pedestrian flows on each road at the plurality of historical moments, which can achieve intelligent prediction of pedestrian flow.

Step 320, determining the at least one target garbage sweeping point based on the garbage accumulation and flow information.

In some embodiments, the management platform may set a second preset threshold and a second preset condition. When the garbage accumulation on the road is greater than the second preset threshold and the flow information meets the second preset condition, the road may be determined to be a target garbage sweeping point. The second preset threshold is a preset value for another range of garbage accumulation. The second preset condition may be a preset condition related to limiting the flow information on the road, and the flow information may include the pedestrian flow and/or the traffic flow. For example, the second preset threshold is 2 square meters, and the second preset condition is that the pedestrian flow is greater than 200 people/hour and/or the traffic flow is greater than 200 vehicles/hour. The management platform may identify a road as the target garbage sweeping point when the garbage accumulation (e.g., the garbage volume) on the road is greater than the second preset threshold value of 2 square meters, and/or when the pedestrian flow is greater than the second preset condition of 200 people/hour and/or the traffic flow is greater than 200 vehicles/hour.

As another example, the second preset threshold is 2 square meters and the second preset condition is that a predicted pedestrian flow at future moment t is greater than 300 people/hour and/or a predicted traffic flow at future moment t is greater than 300 vehicles/hour. The management platform may identify a road as the target garbage sweeping point when the garbage accumulation (e.g., the garbage volume) on the road is greater than the second preset threshold of 2 square meters, and when the predicted pedestrian flow at future moment t is greater than the second preset condition of 300 people/hour and/or the predicted traffic flow is greater than 300 vehicles/hour. For more information about the traffic flow, please refer to FIG. 4 and the related description.

In some embodiments of the present disclosure, by obtaining the monitoring information on the road within the road network area, determining the flow information on the road, and combining the garbage accumulation with the flow information, the target garbage sweeping point can be determined in real time according to the actual flow situation.

Figure 4:
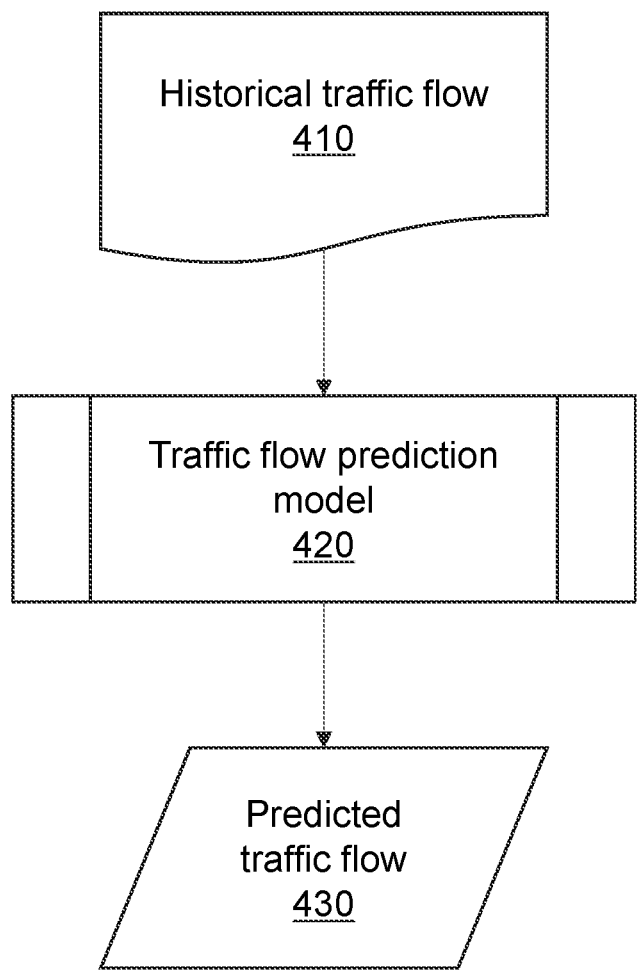
FIG. 4 is an exemplary schematic diagram illustrating a traffic flow prediction model according to some embodiments of the present disclosure.

FIG. 4 is an exemplary schematic diagram illustrating a traffic flow prediction model according to some embodiments of the present disclosure.

In some embodiments, the flow information may also include the traffic flow.

The traffic flow is a number of vehicles passing through the road per unit time period. For example, the number of vehicles passing through road 6 from 8:00 a.m. to 9:00 a.m. is 300. Road 6 has a traffic flow of 5 vehicles/minute during this time period.

In some embodiments, the management platform may use video algorithms to determine the traffic flow on the road based on the monitoring information on the road within the road network area. In some embodiments, the management platform may determine the traffic flow on the road based on induction coils combined with monitoring information on the road in the road network area. For example, the induction coils may be buried under the road and digital cameras may be set up on the crossbars for monitoring, so that the traffic flow on the road may be obtained in real time when the vehicles are moving on the road.

In some embodiments, the flow information may also include a predicted traffic volume at a future moment on each of the at least one road. In some embodiments, the management platform may determine the predicted traffic flow through a traffic flow prediction model based on historical traffic flows on each road at a plurality of historical moments, and the traffic flow prediction model is a machine learning model.

The predicted traffic flow is a predicted traffic flow on the road that is likely to pass at the future moment. The future moment may be a moment that is some time away from the current time point. In some embodiments, the management platform may determine the predicted traffic flow through the traffic flow prediction model based on historical traffic flows on each road at the plurality of historical moments. The traffic flows corresponding to on different roads or the same road at different future moments varies.

The historical traffic flow is a traffic flow on the road corresponding to the historical moment. The historical moment may refer to a moment that corresponds to the future moment. For example, the future moment is 9:00, and the historical moment is 9:00 corresponding to a past time period (e.g., a week, half a month, a month, etc.). For more information about the determining the historical traffic flow on the road, please refer to the description of determining the traffic flow above.

The traffic flow prediction model may be used to predict the predicted traffic flow on each road at future moments. The traffic flow prediction model may be a machine learning model. For example, the traffic flow prediction model may be a Convolutional Neural Network (CNN) model, a Long short-term memory (LSTM) model, etc.

In some embodiments, the input of the traffic flow prediction model 420 may be the historical traffic flows 410 on the road at the plurality of historical moments corresponding to the future moment, and the output of the traffic flow prediction model may be the predicted traffic flow 430 on that road at the future moment.

The parameters of the traffic flow prediction model may be obtained by training. In some embodiments, the traffic flow prediction model may be obtained by training a plurality of groups of traffic flow training samples with traffic flow labels. For example, the plurality of groups of traffic flow training samples with traffic flow labels may be input to an initial traffic flow prediction model, and the loss function may be constructed based on the traffic flow labels and output results of the initial traffic flow prediction model, and the parameters of the traffic flow prediction model may be updated iteratively based on the loss function. The model training may be completed when the loss function of the initial traffic flow prediction model meets the setting requirements, and the trained traffic flow prediction model may be obtained. The setting requirements may be that the loss function converges, the number of iterations reaches a threshold, etc.

In some embodiments, each group of traffic flow training samples may include historical traffic flows on each sample road at the plurality of historical moments corresponding to the future moment. Each group of traffic flow labels may be the actual traffic flow of each group of traffic flow training samples corresponding to the future moment. In some embodiments, the traffic flow training samples may be obtained based on historical traffic flows, and the traffic flow labels may be obtained by manual labeling.

By using the historical traffic flows based on the plurality of historical moments on each road as described in some embodiments of the present disclosure, the predicted traffic flow can be determined by the traffic flow prediction model to achieve intelligent prediction of traffic flow.

FIG. 5 is a flowchart illustrating an exemplary process for determining a garbage sweeping route according to some embodiments of the present disclosure. As shown in FIG. 5, a process 500 includes the following steps. In some embodiments, the process 500 may be executed by the management platform.

In some embodiments, the management platform may identify a planned route from the i-th target garbage sweeping point and back to the starting point in a preferred scheme as the garbage sweeping route.

The i-th target garbage sweeping point is any garbage sweeping point that needs to be processed. For example, the i-th target garbage sweeping point may be a starting garbage sweeping point on the garbage sweeping route that needs to be processed, a middle garbage sweeping point that needs to be processed, a last garbage sweeping point that needs to be processed, etc. The value of i may be a natural number, for example, 1, 2, 3 . . . etc. The maximum value of i may be the number of target garbage sweeping points.

The starting point is a position where the sweeping device is located when it departs. In some embodiments, the management platform may determine the position of the starting point manually.

The preferred scheme is a best scheme selected from a plurality of garbage sweeping route schemes following a competitive preference principle. For example, the preferred scheme may be a garbage sweeping route scheme with the least costly garbage sweeping route.

Step 510, judging whether a preset set meets a preset condition.

In some embodiments, the management platform may judge whether the preset set meets the preset condition. Based on different judgment results, the preferred scheme may be determined in different ways.

The preset set is a set of target garbage sweeping points that need to be processed. The preset set is a set of target garbage sweeping points excluding the starting point. The preset set (not including the starting point) may be expressed as S. For example, $S=\{c_1, \ldots, c_n\}$, where $c_1$ denotes the 1st target garbage sweeping point, $c_n$ denotes the n-th target garbage sweeping point ($1 \leq i \leq n$), and the starting point may be denoted as $c_0$.

In some embodiments, the management platform may determine the preset set based on the plurality of target garbage sweeping points.

The preset condition is a preset relevant condition of starting from the i-th target garbage sweeping point and returning to the starting point. For example, the preset condition may be that the preset set is an empty set (S=∅). When the preset set meets the preset condition, it means that the preset set is empty, and there is no target garbage sweeping point that needs to be processed. Exemplarily, when the preset set meets the preset condition (S=∅), the sweeping device may return directly to the starting point $c_0$ from the i-th target garbage sweeping point $c_i$ without passing through any target garbage sweeping point.

In some embodiments, the management platform may determine the preset condition manually.

In some embodiments, the management platform may determine whether the preset set meets the preset condition by determining whether the preset set is an empty set.

Step 520, in response to the preset set meeting the preset condition, determining a preferred scheme for starting from the i-th target garbage sweeping point and returning to the starting point and a planning cost of the preferred scheme based on a first cost for returning to the starting point from the i-th target garbage sweeping point.

The cost is a cost paid from one target garbage sweeping point to another target garbage sweeping point. The cost may include a cost characterized based on a distance from a target garbage sweeping point to another target garbage sweeping point. The first cost is a cost paid for returning to the starting point from the i-th target garbage sweeping point when the preset set meets the preset condition. For example, the first cost may be a cost characterized by a distance of traveling directly to the starting point $c_0$ from the i-th target garbage sweeping point $c_i$. The planning cost is a cost of the garbage sweeping route of the preferred scheme.

In some embodiments, the management platform may determine the first cost based on the cost of traveling from the i-th target garbage sweeping point to the starting point.

In some embodiments, in response to the preset set meeting the preset condition, the planning cost of the preferred scheme of starting from the i-th target garbage sweeping point and returning to the starting point may be expressed in Equation (1):

$$P(c_{i\ or\ 0}, S) = D(c_{i\ or\ 0}, c_0), \text{ if } S=\emptyset \quad (1).$$

Where $P(c_{i\ or\ 0}, S)$ is the planning cost of the preferred scheme that returns to the starting point $c_0$ after traveling from the i-th target garbage sweeping point $c_i$ or the starting point to all target garbage sweeping points in the preset set S. $D(c_i, c_0)$ is the cost (i.e., the first cost) of traveling to the starting point $c_0$ from the i-th target garbage sweeping point $c_i$. The management platform may obtain distances from different target garbage sweeping points to the starting point through a distance matrix, and determine the corresponding first cost based on the distance. The distance matrix may represent a matrix of distances between the starting point and different target garbage sweeping points, and a matrix of distances between different target garbage sweeping points. The distance matrix may be a preset matrix in advance.

In some embodiments, the first cost is also related to an estimated time to reach the target garbage sweeping point. In some embodiments, the first cost is also related to an estimated garbage growth rate after sweeping to reach the target garbage sweeping point. For more information about the estimated time to reach the target garbage sweeping point and the estimated garbage growth rate after sweeping to reach the target garbage sweeping point, please refer to the following description.

Step 530, in response to the preset set not meeting the preset condition, determining a preferred scheme for starting from the i-th target garbage sweeping point and returning to the starting point and a planning cost of the preferred scheme based on a comparison of a plurality of second costs.

The second cost is a cost paid for returning to the starting point from the i-th target garbage sweeping point when the preset set does not meet the preset condition. For example, when the preset condition is not the empty set (S=0), the second cost of returning to the starting point from the i-th target garbage sweeping point may be a cost characterized by a distance from the i-th target garbage sweeping point $c_i$ to the transit target garbage sweeping point (e.g., the j-th transit target garbage sweeping point $c_j$, and i≠j) and back to the starting point $c_0$.

In some embodiments, the management platform may determine the plurality of second costs based on a plurality of reference schemes for traveling from the i-th target garbage sweeping point and return to the starting point through the plurality of transit target garbage sweeping points. There may be various situations of passing through the plurality of transit target garbage sweeping points (e.g., passing orders may be different, etc.), each situation corresponding to a reference scheme and a second cost.

The transit target garbage sweeping point is one or more intermediate target garbage sweeping points that are passed from the i-th target garbage sweeping point and back to the starting point. For example, the transit target garbage sweeping point may be a target garbage sweeping point other than the i-th target garbage sweeping point and the starting point (e.g., the j-th transit target garbage sweeping point $c_j$, etc., and i≠j).

In some embodiments, the management platform may determine the transit target garbage sweeping point based on the i-th target garbage sweeping point and the starting point according to the transit target garbage sweeping point determination model. The transit target garbage sweeping point determination model may be a machine learning model. For example, based on the historical i-th target garbage sweeping point and the historical starting point, the transit target garbage sweeping point may be determined based on the machine learning model. In some embodiments, the input of the transit target garbage sweeping point determination model may be different target garbage sweeping points and starting points, and the output of the transit target garbage sweeping point determination model may be transit target garbage sweeping points.

The cost of traveling from the i-th target garbage sweeping point to the plurality of transit target garbage sweeping points may be a cost characterized by the distance from the i-th target garbage sweeping point to the plurality of transit target garbage sweeping points. For example, the cost of traveling from the i-th target garbage sweeping point to the j-th transit target garbage sweeping point may be the cost characterized by the distance from the i-th target garbage sweeping point $c_i$ to the j-th transit target garbage sweeping point $c_j$, etc.

The plurality of reference schemes are the reference schemes of the garbage sweeping route from the i-th target garbage sweeping point to the plurality of transit target garbage sweeping points and the garbage sweeping route from the plurality of transit target garbage sweeping points and back to the starting point.

The second cost of the reference scheme may be expressed as $D(c_{i \text{ or } 0}, c_j)+P(c_j, S-c_j)$, where $D(c_{i \text{ or } 0}, c_j)$ is the cost of traveling form the i-th target garbage sweeping point $c_i$ or the starting point $c_0$ to the transit target garbage sweeping point $c_j$, the transit target garbage sweeping point $c_j$ is included in the preset set S. Specifically, $D(c_{i \text{ or } 0}, c_j)$ may be determined based on a distance obtained from a n×n distance matrix, the n×n distance matrix includes the distance between the i-th target garbage sweeping point $c_i$ or the starting point $c_0$ and the j-th target garbage sweeping point $c_j$. $P(c_j, S-c_j)$ is the minimum cost of returning to the starting point from the j-th transit target garbage sweeping point $c_j$. The value of the second cost $D(c_{i \text{ or } 0}, c_j)+P(c_j, S-c_j)$ may be different for different reference schemes in which i and j take different values.

In some embodiments, in response to the preset set not meet the preset condition (e.g., when S=Ø), the preferred scheme may be a shortest garbage sweeping route from the i-th target garbage sweeping point $c_i$ to the plurality of transit target garbage sweeping points and then back to the starting point $c_0$. The planning cost may be the cost characterized by the shortest distance of traveling form the i-th target garbage sweeping point $c_i$ to the plurality of transit target garbage sweeping points and then back to the starting point $c_0$.

In some embodiments, the management platform may determine a preferred scheme for starting from the i-th target garbage sweeping point and returning to the starting point and its planning cost based on a comparison of the plurality of second costs.

In some embodiments, in response to the preset set not meet the preset condition (e.g., S=Ø), the planning cost may be expressed in equation (2):

$$(c_{i \text{ or } 0}, S) = \min_{c_j \in S}\{D(c_{i \text{ or } 0}, c_j) + P(c_j, S - c_j)\}. \quad (2)$$

Where $$\min_{c_j \in S}\{D(c_{i \text{ or } 0}, c_j) + P(c_j, S - c_j)\}$$

is the smallest value among the plurality of second costs corresponding to the plurality of reference schemes when j takes different values. For example, when the starting point is $c_0$ and S is {c1, c2, c3}, equation (2) may be expressed as:

$$P(c_0, S) = \min_{c_j \in S}\{D(c_0, c_j) + P(c_j, S - c_j)\} = \min\{D(c_0, c_1) + P(c_1, S - c_1),$$

$$D(c_0, c_2) + P(c_2, S - c_2), D(c_0, c_3) + P(c_3, S - c_3)\}.$$

Where $P(c_1, S-c_1)$, $P(c_2, S-c_2)$, $P(c_3, S-c_3)$ may be further split according to the above equation and kept recursive until all values may be directly obtained (based on equation (1)).

In some embodiments, the second cost may be also related to the estimated time to reach the target garbage sweeping point. In some embodiments, the second cost is also related to the estimated garbage growth rate after sweeping to reach the target garbage sweeping point. For more information about the estimated time to reach the target garbage sweeping point and the estimated garbage growth rate after sweeping to the target garbage sweeping point, please refer to the following description.

By determining the planning route in the preferred scheme of starting from the i-th target garbage sweeping point and returning to the starting point as the garbage sweeping route as described in some embodiments of the present disclosure, the preferred garbage sweeping route can be dynamically planned based on the target garbage sweeping point, and the value of the garbage sweeping route can be improved based on the plurality of reference schemes and actual transit target garbage sweeping points, saving manpower and material resources.

In some embodiments, the first cost and/or the second cost are also related to the estimated time to reach the target garbage sweeping point. The estimated time to reach the target garbage sweeping point is related to a real-time traffic flow and a predicted traffic flow at a future moment of one of the at least one target garbage sweeping point.

The estimated time to reach the target garbage sweeping point is an estimated time to reach the target garbage sweeping point from a current position. For example, the estimated time to reach the target garbage sweeping point may be 10 minutes, 30 minutes, etc.

In some embodiments, the estimated time to reach the target garbage sweeping point is related to the real-time traffic flow and the predicted traffic flow at the future moment of one of the at least one target garbage sweeping point. For example, a garbage truck may choose to go to the target garbage sweeping point A or the target garbage sweeping point B currently. The management platform may use the real-time traffic flow to determine that the road to the target garbage sweeping point A is more congested and the road to the target garbage sweeping point B is more smooth at the current time. It may be seen that the estimated time to reach the target garbage sweeping point A is longer, corresponding to a larger first cost; and the estimated time to reach the target garbage sweeping point B is shorter, corresponding to a smaller first cost.

As another example, the management platform may use the predicted traffic flow at the future moment to determine that the road to the target garbage sweeping point A starts to be smooth and the road to the target garbage sweeping point B starts to be congested after 10 minutes. It is known that the estimated time to reach the target garbage sweeping point A after 10 minutes is shorter and corresponds to a smaller first cost; and the estimated time to reach the target garbage sweeping point B after 10 minutes is longer and corresponds to a larger first cost. Then the traffic jam may be avoided by going to the target garbage sweeping point A first, and then to the target garbage sweeping point B after 10 minutes.

In some embodiments, the first cost and/or second cost associated with the estimated time to reach the target garbage sweeping point may vary dynamically with time. For example, the garbage truck is located at the target garbage sweeping point A at the current moment $t_0$, and the estimated time $t_1$ of traveling from the target garbage sweeping point A to the target garbage sweeping point B may be obtained by prediction. Assuming that it takes 1 h to sweep at the target garbage sweeping point B, the moment is $t_0+t_1+1$ h when the garbage truck goes from the target garbage sweeping point B to the target garbage sweeping point C after completing the sweeping at the target garbage sweeping point B. If the estimated time $t_2$ from the target garbage sweeping point B to the target garbage sweeping point C needs to be predicted, i.e., the change of the estimated time $t_2$ with the estimated time $t_1$ needs to be predicted based on the traffic flow from the target garbage sweeping point B to the target garbage sweeping point C at the moment $t_0+t_1+1$ h.

By the first cost and/or second cost also correlating to the estimated time to reach the target garbage sweeping point described in some embodiments of the present disclosure, the garbage sweeping sequence can be better determined based on the estimated time, thereby reducing the congested road time and determining the garbage sweeping route more easily and time-savingly through actual road conditions.

In some embodiments, the first cost and/or second cost is also related to a estimated garbage growth rate after sweeping to the target garbage sweeping point.

The estimated garbage growth rate after sweeping to the target garbage sweeping point is an estimated garbage growth rate of garbage sweeping point after the sweeping at the future moment. For example, the estimated garbage growth rate after sweeping to the garbage sweeping point A may be 100 kg/2 h.

In some embodiments, the estimated garbage growth rate after sweeping may be obtained by processing the garbage growth rate and garbage accumulation before sweeping based on a growth rate prediction model.

In some embodiments, the first cost and/or second cost of the estimated garbage growth rate after sweeping to the target garbage sweeping point may vary dynamically over time. For example, at 9:00 a.m., the management platform may choose to go first to target garbage sweeping point A or target garbage sweeping point B. If the target garbage sweeping point A is reached first, the estimated garbage growth rate after sweeping (e.g., after 10:00, etc.) may be determined after the target garbage sweeping point A is swept (e.g., the target garbage sweeping point A is swept at 10:00, etc.). Based on the arrival time at the target garbage sweeping point B (e.g., arriving at 10:30, etc.) and the time required to complete sweeping (e.g., taking 1.5 hours, etc.), the estimated garbage growth rate after sweeping (e.g., after 12:00, etc.) of the target garbage sweeping point B may be determined.

The management platform may determine the first cost/second cost based on the estimated garbage growth rate after sweeping of two target garbage sweeping points. The management platform may also determine the respective estimated garbage growth rate after sweeping of sweeping the target garbage sweeping point B and then sweeping the target garbage sweeping point A based on the above approach, and determine the corresponding first cost/second cost. Since the time for sweeping each target garbage sweeping point is different in the two approaches, their estimated garbage growth rates after sweeping may be also different, then the impacts on the first cost/second cost may be different.

The growth rate prediction model may be used to predict the garbage growth rate at future moments after the road is swept. The growth rate prediction model may be a machine learning model.

In some embodiments, the input of the growth rate prediction model may be the garbage growth rate before sweeping and the garbage accumulation, and the output of the growth rate prediction model may be the estimated garbage growth rate after sweeping. The estimated garbage growth rate after sweeping corresponds to the predicted future moment after sweeping. For example, the current moment is 08:00, and the predicted moment after sweeping is 09:00. The estimated garbage growth rate after sweeping is the garbage growth rate corresponding to the future moment of 09:00.

The parameters of the growth rate prediction model may be obtained by training. In some embodiments, the growth rate prediction model may be obtained by training a plurality of groups of predicted rate training samples with predicted rate labels. For example, the plurality of groups of predicted rate training samples with predicted rate labels may be input to the initial growth rate prediction model, a loss function may be constructed based on the predicted rate labels and the output results of the initial growth rate prediction model, and the parameters of the growth rate prediction model may be updated iteratively based on the loss function. The model training may be completed when the loss function of the initial growth rate prediction model meets the setting requirements, and the trained growth rate prediction model may be obtained. The setting requirements may be that the loss function converges, the number of iterations reaches a threshold, etc.

In some embodiments, each group of predicted rate training samples may include sample garbage growth rate before sweeping and sample garbage accumulation. Each group of predicted rate labels may be the actual garbage growth rate after sweeping at a future moment corresponding to each group of predicted rate training samples. In some embodiments, the predicted rate training samples may be obtained based on historical garbage growth rates before sweeping and garbage accumulation, and the predicted rate labels may be obtained by manual labeling.

In some embodiments of the present disclosure, the growth rate prediction model may process the garbage growth rate before sweeping and garbage accumulation to obtain the estimated garbage growth rate after sweeping, which can timely clean the dirtier road environment to avoid garbage accumulation. Combined with the estimated garbage growth rate after sweeping as the relevant amount of the cost, the garbage sweeping route can be determined more accurately.

In some embodiments, the input of the growth rate prediction model also includes the pedestrian flow at the target garbage sweeping point and the predicted pedestrian flow at the target garbage sweeping point at the future moment.

The pedestrian flow at the target garbage sweeping point is a number of people passing through the target garbage sweeping point per unit time. For example, if the number of people passing through the target garbage sweeping point A from 8:00 a.m. to 12:00 p.m. is 3000, the pedestrian flow at the target garbage sweeping point A during that time period is 750 people/hour or 13 people/minute. For more information about determining the pedestrian flow, please refer to FIG. 2 and the related descriptions thereof.

The predicted pedestrian flow at the target garbage sweeping point at the future moment is a pre-estimated number of people likely to pass through the target garbage sweeping point at the future moment. In some embodiments, the management platform may determine the predicted pedestrian flow through a pedestrian flow prediction model based on the historical pedestrian flow of each target garbage sweeping point at the plurality of historical moments. For more information about the predicted pedestrian flow and the pedestrian flow prediction model please refer to FIG. 3 and the related descriptions thereof.

In some embodiments, each group of predicted rate training samples also includes the sample pedestrian flow at the target garbage sweeping point and the sample predicted pedestrian flow at the target garbage sweeping point at the future moment.

In some embodiments of the present disclosure, the input of the growth rate prediction model includes the pedestrian flow at the target garbage sweeping point and the predicted pedestrian flow of the target garbage sweeping point at the future moment, which can make the growth rate prediction model more accurately determine the estimated garbage growth rate at the target garbage sweeping point after sweeping. On the other hand, by promptly sweeping the garbage growing on the road, the garbage accumulation caused by a herding effect of pedestrians can be avoided and road cleanliness can be effectively maintained.

FIG. 6 is a flowchart illustrating an exemplary process for determining a garbage sweeping point in a smart city according to some embodiments of the present disclosure. As shown in FIG. 6, a process 600 includes the following steps. In some embodiments, the process 600 may be executed by the management platform.

Step 610, obtaining monitoring information on at least one road within a road network area, and identifying a target object on the at least one road.

For more information about the road network area and monitoring information, please refer to FIG. 2 and the related descriptions thereof.

The target object is an object that needs attention during garbage sweeping. In some embodiments, the target object may include at least the garbage to be processed. The garbage to be processed is the garbage that needs to be swept, etc. For example, the garbage to be processed may be leaves from trees, packaging boxes, beverage bottles and other garbage on the road.

In some embodiments, the management platform may obtain the monitoring information on at least one road within the road network area through the object platform. The management platform may determine the target object by performing image recognition on the monitoring information. For example, the management platform may compare the contours in the monitoring information with those in the standard image information database and identify the target object based on the comparison results. The standard image information database may contain the contours of common objects on the road. The management platform may construct the standard image information database based on the image pixel information of common objects on the road. In some embodiments, the management platform may continuously obtain the monitoring information, thereby identifying the target objects at different moments and on different roads.

Figure 7:
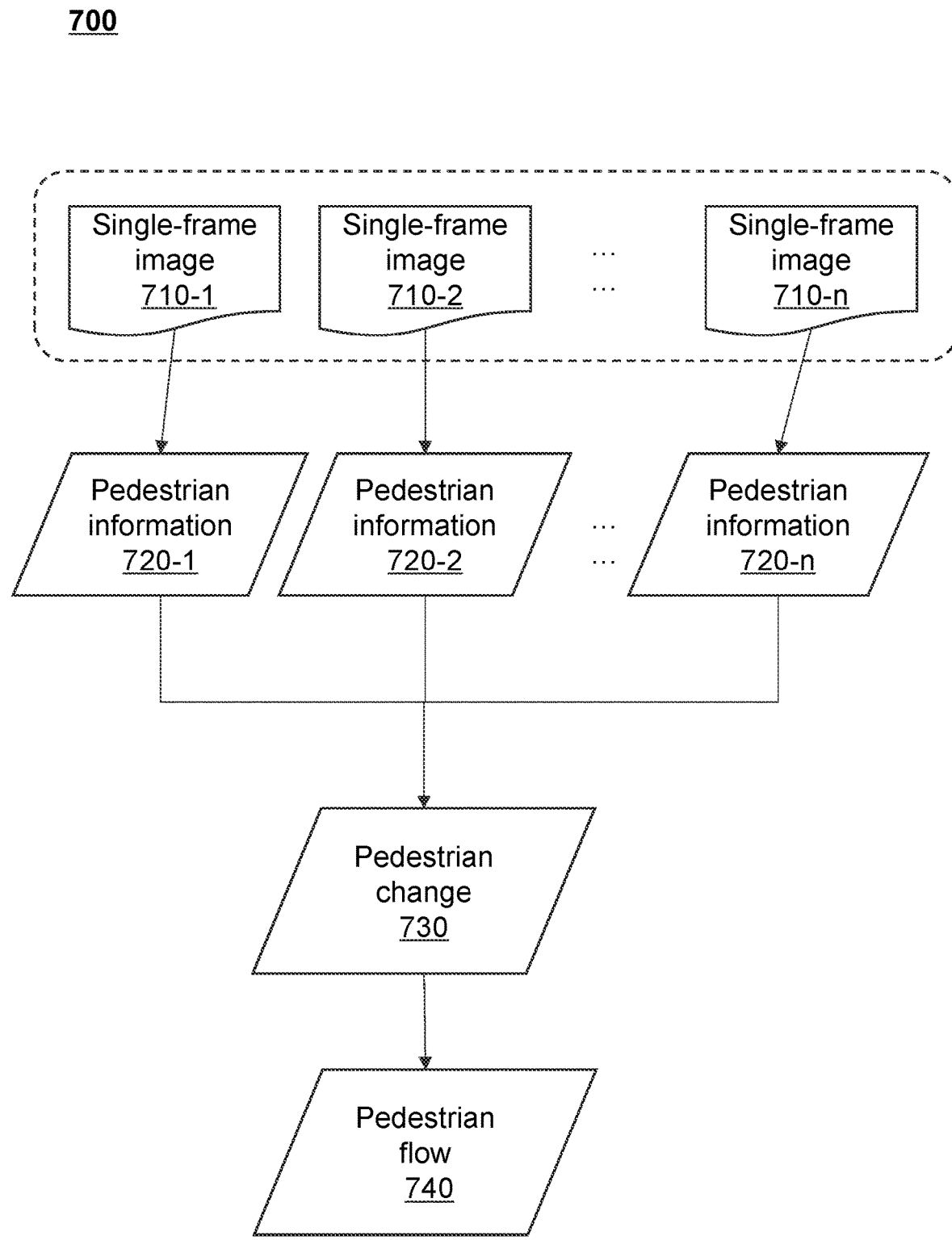
FIG. 7 is a schematic diagram illustrating an exemplary process for determining information related to a target object according to some embodiments of the present disclosure.

In some embodiments, the target object may also include a pedestrian, for more descriptions of the pedestrian, refer to FIG. 7 and the related descriptions thereof.

Step 620, determining, based on an identification result, information related to the target object.

The identification result is a result obtained by identifying the target object contained in the monitoring information, for example, the garbage to be processed, pedestrians in the image of the monitoring information, etc.

The information related to the target object is relevant information of the target object. In some embodiments, the information related to the target object may include at least the garbage volume of the garbage to be processed, etc.

The garbage volume of the garbage to be processed is an amount of garbage to be processed. The garbage volume of the garbage to be processed may be expressed in various ways. For example, the garbage volume of the garbage to be processed may be expressed by the amount of the garbage to be processed, the area covered by garbage to be processed on the road, the volume of garbage to be processed, the number of garbage piles to be processed, etc. The garbage volume of garbage to be processed may be set as different levels (e.g., none, less, average, more, great many, etc.) according to the amount and/or the area covered on the road, volume, etc.

In some embodiments, the information related to the target object may also include the position of the garbage to be processed on the road, etc.

In some embodiments, the management platform may determine the garbage volume of the garbage to be processed on different roads in a variety of ways. For example, the management platform may determine the garbage volume of the garbage to be processed on different roads by counting the target objects contained in the monitoring information based on the identification results on the different roads.

Exemplarily, the management platform may calculate the ratio of the pixels of the garbage to be processed in the image of the monitoring information to the total pixels in the image, and then calculate the area covered by the garbage to be processed on the different roads by the ratio and the total area of the roads in the image. The management platform may determine the level of garbage volume to be processed on the different roads according to preset level rules (e.g., coverage area less than 1 square meter being less, coverage area between 1 square meter and 5 square meters being average, coverage area more than 5 square meters being more, etc.). As another example, the management platform may determine the garbage volume of garbage to be processed by counting the amount of garbage to be processed and/or the number of garbage piles. The management platform may also determine the garbage volume of the garbage to be processed on different roads based on the area and height covered by garbage and/or garbage piles, etc.

In some embodiments, the information related to the target object also includes the pedestrian flow, which is described in detail in FIG. 7 and the related description thereof.

Step 630, determining at least one target garbage sweeping point based on the information related to the target object.

The target garbage sweeping point is a garbage sweeping point that needs to be processed. For example, the target garbage sweeping point may be a road with a highest garbage volume of the garbage to be processed. For more information about the target garbage sweeping point, please refer to FIG. 2 and the relevant description thereof.

In some embodiments, the management platform may rank the garbage volume of the garbage to be processed on at least one road and use top-ranked (e.g., top 10, top 20, etc.) roads as the target garbage sweeping points. In some embodiments, the management platform may regard roads where the garbage volume to be processed exceeds a threshold (e.g., the garbage volume level exceeds "average" and/or the area covered by garbage exceeds 5 square meters, etc.) as the target garbage sweeping points.

In some embodiments of the present disclosure, identifying the target object and information of the target object to determine the target garbage sweeping point through monitoring information can timely sweep roads with large garbage volume, thereby avoiding inconvenience or bad experience for passing pedestrians due to too much garbage and improving city living environment.

In some embodiments, the management platform may generate a remote control instruction and send the remote control instruction to the sensor network platform based on at least one target garbage sweeping point, and send the remote control instruction to the object platform based on the sensor network platform to cause the object platform to perform a sweeping operation.

The remote control instruction is a control instruction issued by the management platform. For example, the remote control instruction may be an instruction issued from the management platform to perform the sweeping operation on the target garbage sweeping point.

In some embodiments, the management platform may determine a garbage sweeping route based on at least one target garbage sweeping point as the remote control instruction. For more information about the remote control instruction please refer to FIG. 2 and the related descriptions thereof.

The sweeping operation refers to the sweeping of the garbage to be processed. For example, the sweeping operation may be the sweeping of the garbage to be processed on the road by cleaners, etc.

In some embodiments, in response to the remote control instruction, the object platform may perform the garbage sweeping via a sweeping robot based on the remote control instruction. In some embodiments, the object platform may send the garbage sweeping route in the remote control instruction to the person and/or company in charge of the garbage sweeping, and the person and/or company may organize the personnel to carry out the sweeping.

In some embodiments of the present disclosure, the remote control instruction is generated based on at least one target garbage sweeping point and sent to the object platform for sweeping operation, which can monitor the garbage to be processed on the road in real time, thereby sweeping the garbage on the road in time to improve the city living environment and city image.

FIG. 7 is a schematic diagram illustrating an exemplary process for determining information related to a target object according to some embodiments of the present disclosure.

In some embodiments, the target object may also include pedestrians, and the information related to the target object may also include the pedestrian flow. The management platform may determine a pedestrian change based on the pedestrian information and determine the pedestrian flow based on the pedestrian change, the pedestrian information is an identification result obtained by recognizing a single-frame image, and the pedestrian change is an identification result obtained by recognizing multi-frame images.

The pedestrian is a person who passes through the road corresponding to the monitoring information. For example, the pedestrian may be people who pass by on their way to and from work.

In some embodiments, the management platform may identify at least one contour in the image based on the pixel distribution, gray value of the image in the monitoring information, etc. The management platform may compare the at least one contour in the image with the contour of the human body, and thus identify the pedestrian on the road. In some embodiments, the management platform may take pedestrians in at least one frame of the monitoring images from the identified monitoring information as target objects.

The pedestrian information is information related to the pedestrian. For example, the pedestrian information may be clothing information, facial information of the pedestrian, etc. The pedestrian information may be different for each pedestrian.

In some embodiments, the management platform may identify the pixels of the pedestrian's clothing in terms of color, pattern, etc., to determine clothing characteristics of the pedestrian and use the clothing characteristics of the pedestrian as the pedestrian information. In some embodiments, the management platform may identify facial characteristics of the pedestrian based on a face identification algorithm and use the facial characteristics of the pedestrian as the pedestrian information. In some embodiments, each group of pedestrian information corresponds to one pedestrian.

The pedestrian change refers to a change in the pedestrian. For example, if the image at 9:00 has pedestrians A, B, C, and D, and the image at 9:10 has pedestrians A, C, and D, that is, one pedestrian (B) changes. In some embodiments, the pedestrian change may be expressed in terms of a number, as in the example shown firstly, the pedestrian change is 1. In some embodiments, the pedestrian change may be a new appearance of a pedestrian or a pedestrian leaving the image screen.

In some embodiments, as shown in FIG. 7, a plurality of single-frame images 710-1, 710-2, . . . , 710-$n$ are arranged in a time series, and the management platform may compare pedestrian information 720-1, 720-2, . . . , 720-$n$ identified from the single-frame images to determine the pedestrian change. For example, the pedestrian information 720-2 obtained from the single-frame image 710-2 may be compared with the pedestrian information 720-1 obtained from the previous single-frame image 710-1 to determine the pedestrian change 730.

The pedestrian flow is a number of pedestrians passing through the road per unit time. For example, the pedestrian flow of a road is 10 people/minute, etc.

In some embodiments, the management platform may determine the pedestrian flow 740 for different time periods by counting a plurality of pedestrian changes 730 during the different time periods. For example, a time interval between the shooting times of adjacent single-frame images is 10 seconds, the management platform may determine a pedestrian flow from 9:00 to 9:01 based on the pedestrian information on seven single-frame images between 9:00 and 9:01 (including the time of both endpoints). The comparison of every two adjacent pedestrian information may determine 6 pedestrian changes. The pedestrian flow from 9:00 to 9:01 may be determined by summing the six pedestrian changes.

In some embodiments of the present disclosure, by identifying single-frame images and multi-frame images to determine the pedestrian flow of the target object, roads with high pedestrian flow may be identified as target garbage sweeping points, thus roads with high pedestrian flow may be prioritized for sweeping, and the impact of the garbage to be processed on pedestrians may be minimized.

In some embodiments, the information related to the target object may also include a first pedestrian comfort degree on each road of the at least one road. The management platform may determine the first pedestrian comfort degree based on a travel speed of the pedestrian through a garbage gathering point on the each road and a dwell time of the pedestrian on the each road.

The first pedestrian comfort degree refers to a comfort degree of the pedestrian while passing through the road. For example, the first pedestrian comfort degree may be higher when there is no garbage to be processed or less garbage to be processed on the road. As another example, when there is a large amount of garbage to be processed on the road, the garbage to be processed may have an odor and affect pedestrian traffic (such as the garbage to be processed blocking the road, the garbage to be processed easy to be stepped on, etc.), etc., and the first pedestrian comfort degree may be low.

In some embodiments, the management platform may determine the first pedestrian comfort degree based on the travel speed of the pedestrian passing through the garbage gathering point on the each road and the dwell time of the pedestrian on the each road.

The garbage gathering point is a place where garbage is accumulated. For example, the garbage gathering point may be a position of the garbage cans on the road, a position where a large amount of garbage is accumulated, etc.

In some embodiments, the management platform may determine the garbage gathering point in a variety of ways. For example, the management platform may identify a place with large amount of garbage accumulation in the image based on the garbage volume of the garbage to be processed and determine a place with a garbage accumulation exceeding an area threshold (e.g., 2 square meters, etc.) as the garbage gathering point. As another example, the management platform may identify a garbage gathering facility (e.g., a bin, a garbage can, a garbage truck, etc.) in an image as the garbage gathering point.

The travel speed is a speed at which the pedestrian travels. For example, the travel speed may be a speed of the pedestrian passing through the garbage pile. The travel speed of the pedestrian passing through the garbage gathering point is faster, indicating that the pedestrian wants to leave that garbage gathering point on the road as soon as possible, and the first pedestrian comfort degree corresponding to the road may be lower.

In some embodiments, the management platform may identify the positions of the pedestrian in the multi-frame images corresponding to different adjacent time points, respectively, thereby calculating the distance travelled by the pedestrian and calculating the travel speed of the pedestrian in combination with the times corresponding to the multi-frame images.

The dwell time is a length of time that the pedestrian appears and stays. For example, the dwell time may be a length of time spent by the pedestrian walking along a certain road. The shorter the average dwell time of the pedestrian is, the less willing the pedestrian is to stay on the road, and the lower the first pedestrian comfort degree corresponding to the road is.

In some embodiments, the management platform may identify the images of a plurality of consecutive frames where the pedestrian position does not change in the multi-frame images sorted by time series and a first frame image where the position changes, and calculate the dwell time of the pedestrian based on the time corresponding to consecutive multi-frame images when the pedestrian position does not change. For example, if the pedestrian is located at position C in the multi-frame images from 10:00 to 10:10, and the position of the pedestrian in the image changes at 10:10:01, that is, the dwell time of the pedestrian at position C is 10 minutes.

In some embodiments, the management platform may determine the first pedestrian comfort degree on each road based on a combination of the travel speed and dwell time. For example, the management platform may calculate the first pedestrian comfort degree F. on each road thorough equation (3):

$$F=k_1(T-T_0)-k_2(V-V_0) \qquad (3).$$

Where $k_1$ and $k_2$ are coefficients greater than 0, which may be set according to specific needs; T is the average dwell time of the pedestrian, $T_0$ is a reference average dwell time, V is the travel speed through the garbage gathering point, and $V_0$ is a reference travel speed.

The management platform may determine $T_0$ based on the average pedestrian dwell time on the corresponding road with no or less garbage under a same condition. The management platform may determine $V_0$ based on the speed of the pedestrian passing through the corresponding road with no garbage under a same condition. The same condition may include the same time period (e.g., 9:00-10:00 a.m.), etc.

For example, $T_0$ and $V_0$ may be the average dwell time and average travel speed of the pedestrian on the road during the same time period in the historical data. The different time periods correspond to different $T_0$ and $V_0$. The longer the average dwell time T is, the lower the impact of garbage on pedestrian comfort may be, and the higher the first pedestrian comfort degree may be. The greater the travel speed V passing through the garbage gathering point is, the greater the impact of garbage on pedestrian comfort may be, and the lower the first pedestrian comfort may be. $k_1$, $k_2$, $T_0$, and $V_0$ in equation (3) corresponds to the first pedestrian comfort degree on each of at least one road may be the same or different and may be set up by the management platform according to the actual condition on each road.

In some embodiments, the management platform may also calculate the first pedestrian comfort degree by other equations or methods (e.g., direct differencing, etc.).

In some embodiments of the present disclosure, the first pedestrian comfort degree is determined based on the dwell time and travel speed, and the road with low first pedestrian comfort degree may be identified as the target garbage sweeping point, and thus the road with more obvious impact on pedestrians may be cleaned in time, and the impact of the garbage to be processed on pedestrians may be further reduced.

In some embodiments, the information related to the target object may also include a second pedestrian comfort degree at a future moment on each of the at least one road. The management platform may predict the second pedestrian comfort degree by a comfort degree prediction model based on the historical pedestrian comfort degree on each road at the plurality of historical moments, and the comfort degree prediction model may be a machine learning model.

The second pedestrian comfort degree at the future moment is a comfort degree of the pedestrian passing through the road at a certain future moment from the current moment. For example, the comfort degree of the pedestrian on road D at a further moment that is one hour from the current moment.

The historical pedestrian comfort degree of a historical moment is a pedestrian comfort degree of a past moment, for example, the comfort degree of the pedestrian on road E at a plurality of moments of the day (e.g., 7:00, 9:00, 12:00, etc.) during a past month. In some embodiments, the management platform may directly read the first pedestrian comfort degree at the plurality of past moments in the historical database as the historical pedestrian comfort degree of historical moments.

In some embodiments, the management platform may predict a second pedestrian comfort degree on each road through a comfort degree prediction model based on the historical pedestrian comfort degree on each road at the plurality of historical moments.

In some embodiments, the comfort degree prediction model may be a time-series machine learning model, such as a recurrent neural network (RNN) model, a long short-term memory network (LSTN) model, etc.

In some embodiments, the input of the comfort degree prediction model may include historical pedestrian comfort degrees on a certain road at the plurality of historical moments. The output of the comfort degree prediction model may include a second pedestrian comfort degree on the road at the future moment.

The parameters of the comfort degree prediction model may be obtained by training. In some embodiments, the comfort degree prediction model may be obtained by training a plurality of groups of comfort degree training samples with comfort degree labels. For example, the plurality of groups of comfort degree training samples with comfort degree labels may be input into the initial comfort degree prediction model, and the loss function may be constructed based on the comfort degree labels and the output results of the initial comfort degree prediction model, and the parameters of the initial comfort degree prediction model may be updated iteratively based on the loss function. When the loss function of the initial comfort degree prediction model meets preset requirements, the model training is completed and the trained comfort degree prediction model is obtained. The preset requirements may be that the loss function converges, the number of iterations reaches a threshold, etc.

In some embodiments, each group of comfort degree training samples may include historical pedestrian comfort degrees on each road at the plurality of historical moments. Each group of comfort degree labels may be the actual first pedestrian comfort degree after a certain time in the future corresponding to each group of comfort degree training samples. In some embodiments, the comfort degree training samples and comfort degree labels may be obtained based on the historical first pedestrian comfort degree.

In some embodiments of the present disclosure, the comfort degree prediction model can be used to predict the second pedestrian comfort degree on each road at the future moment, which can enable intelligent prediction of the second pedestrian comfort degree at the future moment. By predicting the second pedestrian comfort degree on each road at the future moment, the roads with lower second pedestrian comfort degree can be identified as the target garbage sweeping points, and thus the roads with more significant impact on the pedestrian at the future moment can be cleaned in time, and the impact of garbage to be processed on the pedestrian at the future moment can be further reduced.

FIG. 8 is another flowchart illustrating an exemplary process for determining at least one target garbage sweeping point according to some embodiments of the present disclosure. As shown in FIG. 8, a process 800 includes the following steps. In some embodiments, the process 800 may be executed by the management platform.

Step 810, determining the at least one road with the garbage volume meeting a predetermined condition as at least one candidate garbage sweeping point.

The predetermined condition may refer to a pre-customized condition related to limiting the garbage volume on the road. For example, the predetermined condition may be that the garbage volume of the garbage to be processed exceeds a first garbage volume threshold. The first garbage volume threshold may refer to the garbage volume on the road. For example, the first garbage volume threshold may be 3 cubic meters, 5 cubic meters, etc.

The candidate garbage sweeping point is a street that may be selected as the target garbage sweeping point. For example, the candidate garbage sweeping point may be a road with a high garbage volume.

In some embodiments, the management platform may identify a road with a garbage volume of the garbage to be processed exceeding a first garbage volume threshold as a candidate garbage sweeping point. For example, when the first garbage volume threshold is that the garbage volume level of the garbage to be processed is average, if the garbage volume level of the road F to be processed is more, the road F is identified as a candidate garbage sweeping point.

Step 820, determining the at least one target garbage sweeping point based on the at least one candidate garbage sweeping point.

In some embodiments, the management platform may use a candidate garbage sweeping point whose garbage volume exceeds the second garbage volume threshold as a target garbage sweeping point, and the second garbage volume threshold is greater than the first garbage volume threshold. In some embodiments, the management platform may rank the garbage volumes of the garbage to be processed in the candidate garbage sweeping points, and the candidate garbage sweeping points with the top ranking (e.g., top 5, top 10, etc.) may be regarded as the target garbage sweeping points. In some embodiments, the management platform may rank the first pedestrian comfort degree of the roads corresponding to the candidate garbage sweeping points, and the candidate garbage sweeping points with lower ranking (e.g., the top 5 of the bottom ranking, the top 10 of the bottom ranking, etc.) of the first pedestrian comfort degree may be regarded as the target garbage sweeping points. For more information about the first pedestrian comfort degree, please refer to FIG. 7 and the related descriptions thereof.

In some embodiments of the present disclosure, by using a road with a garbage volume meeting the predetermined condition as a candidate garbage sweeping point, and then determining the target garbage sweeping point, roads with a high garbage volume can be swept in advance to avoid excessive garbage accumulation affecting the city image and human living environment.

In some embodiments, the management platform may also obtain a garbage growth rate of each of the at least one candidate garbage sweeping point. The management platform may identify the at least one target garbage sweeping point based on the garbage growth rate.

The garbage growth rate is a garbage volume of the garbage to be processed that grows per unit time. Different candidate garbage sweeping points correspond to different garbage growth rates, respectively. For example, if the garbage volume of the garbage to be processed on the candidate garbage sweeping point G is 1 cubic meter at 9:00 a.m. and 5 cubic meters at 11:00 a.m., the garbage growth rate of the candidate garbage sweeping point is 2 cubic meters/h. The garbage volume at candidate garbage sweeping point H is 2 cubic meters at 9 a.m. and 3 cubic meters at 11 a.m., so the garbage growth rate at candidate garbage sweeping point H is 0.5 cubic meters/hour.

In some embodiments, the management platform may calculate the difference between the garbage volume corresponding to the garbage to be processed on the road at two moments, and calculate the garbage growth rate based on the difference and the length of time.

In some embodiments, the garbage growth rate correlates to the pedestrian flow on the road corresponding to the garbage growth rate. For example, the garbage growth rate is positively correlated with the pedestrian flow on the road corresponding to the garbage growth rate. The higher the pedestrian flow is, the higher the garbage growth rate on the corresponding road may be. Exemplarily, when there is a larger pedestrian flow on a road, more people may generate garbage on the road, and the garbage growth rate corresponding to the road may be larger.

In some embodiments, the management platform may determine a correspondence between the pedestrian flow and the garbage growth rate based on historical data and determine the garbage growth rate based on the correspondence. The correspondence may be a function, a cross-reference table, etc.

In some embodiments of the present disclosure, the garbage growth rate may be determined by pedestrian flow, which can enable a more accurate garbage growth rate.

In some embodiments, the management platform may calculate and rank the garbage growth rate of at least one candidate garbage sweeping point, and use the candidate garbage sweeping points with the top ranking of the garbage growth rate (e.g., top 5, top 10, etc.), etc., as the target garbage sweeping points.

In some embodiments, the management platform may set different growth rate preset values for different candidate garbage sweeping points and use the candidate garbage sweeping points whose growth rate exceeds the growth rate preset value as the target garbage sweeping points. The growth rate preset values may be obtained based on historical data. For example, the growth rate preset values may be the median of the growth rate over the plurality of time periods in the historical data, etc.

In some embodiments of the present disclosure, the target garbage sweeping point is determined by the growth rate, which can enable a sweeping operation to be performed on the road with a high garbage volume growth rate. When the road is cleaner, people is more inclined to keep the road clean, which can reduce the garbage growth rate on the road.

In some embodiments, the management platform may also determine the target garbage sweeping point based on the value of the candidate garbage sweeping point. For more information about determining the target garbage sweeping point based on the value of the candidate garbage sweeping point, please refer to FIG. 9 and the related descriptions thereof.

Figure 9:
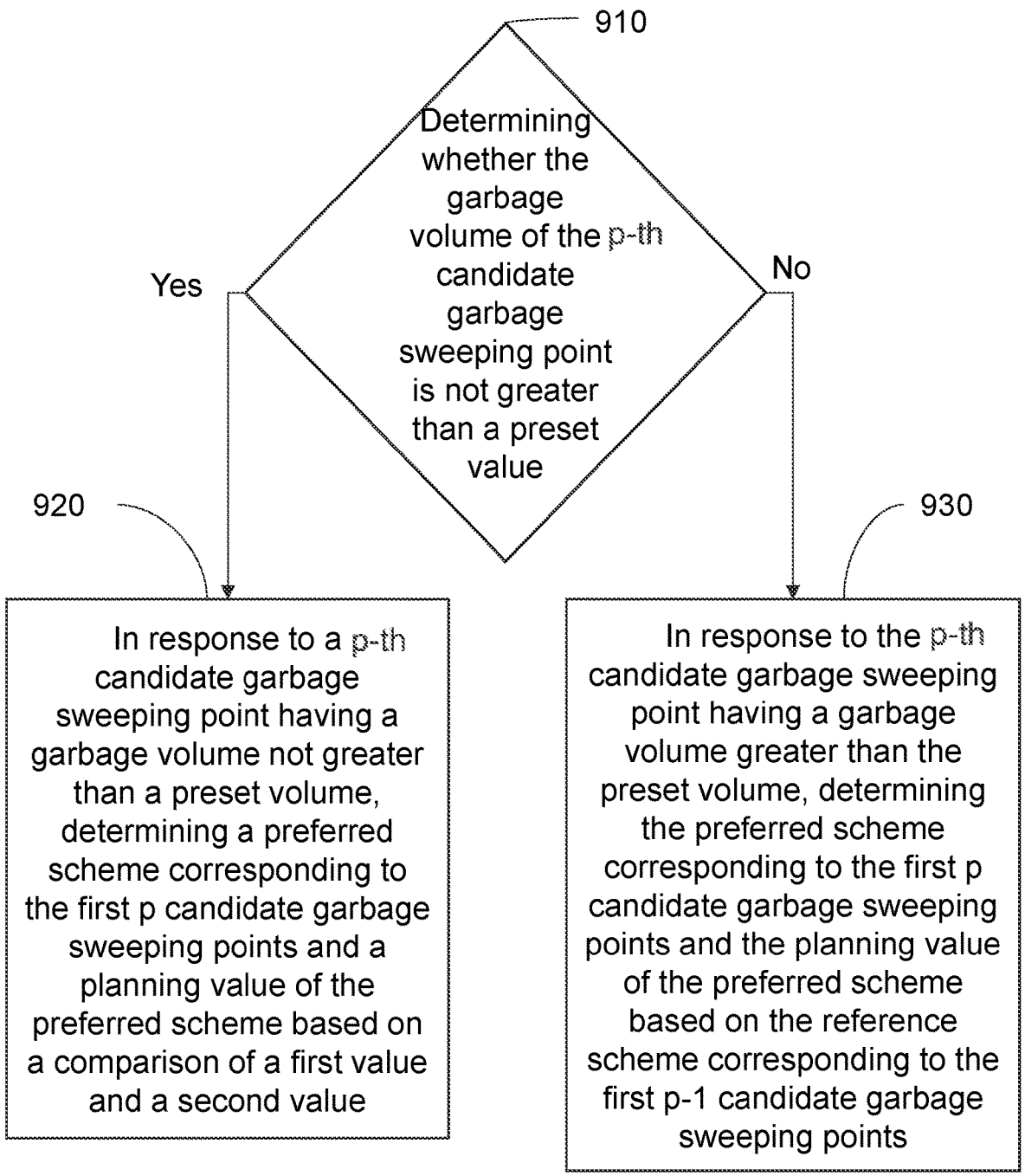
FIG. 9 is another flowchart illustrating an exemplary process for determining at least one target garbage sweeping point according to some embodiments of the present disclosure.

FIG. 9 is another flowchart illustrating an exemplary process for determining at least one target garbage sweeping point according to some embodiments of the present disclosure. As shown in FIG. 9, a process 900 includes the following steps. In some embodiments, the process 900 may be executed by the management platform.

In some embodiments, the management platform 130 may determine the at least one candidate garbage sweeping point in the preferred scheme corresponding to first p candidate garbage sweeping points as the at least one target garbage sweeping point.

The first p candidate garbage sweeping points are p candidate garbage sweeping points before any candidate garbage sweeping point after ranking the candidate garbage sweeping points in any order. The value of p may be a natural number. For example, p may be 1, 2, 3, . . . , etc. The maximum value of p may be a number of candidate garbage sweeping points. In some embodiments of the present disclosure, p takes its value from the maximum value q. q is the number of candidate garbage sweeping points.

The preferred scheme is to select the best scheme from various feasible garbage sweeping schemes by following a principle of comparative preference. For example, the preferred scheme may be the one with the greatest sum of values of the candidate garbage sweeping points in the garbage sweeping scheme. The garbage sweeping scheme may include specific candidate garbage sweeping points to be swept. The value of the candidate garbage sweeping point may be the benefits such as improved pedestrian flow and improved pedestrian comfort degree brought from sweeping the candidate garbage sweeping point.

In some embodiments, the value of the candidate garbage sweeping point is proportional to the garbage volume at the candidate garbage sweeping point. The greater the garbage volume is, the greater the value of the candidate garbage sweeping point may be.

In some embodiments, the value of the at least one candidate garbage sweeping point is also related to pedestrian comfort degree of the at least one candidate garbage sweeping point at the current moment.

The pedestrian comfort degree at the current moment is a comfort degree of the pedestrian passing through the road of the candidate garbage sweeping point at the current moment.

In some embodiments, the lower the pedestrian comfort degree at the current moment is, the greater the value of the candidate garbage sweeping point may be. For example, the current moment is $t_0$, the garbage truck is currently located at candidate garbage sweeping point A, and the value of the garbage truck going to candidate garbage sweeping point B is related to the pedestrian comfort degree of candidate garbage sweeping point B at the current moment (i.e., $t_0$). The lower the pedestrian comfort degree of the candidate garbage sweeping point B at the current moment (i.e., $t_0$) is, the greater the improvement of pedestrian comfort degree brought by the garbage truck going to the candidate garbage sweeping point B for garbage sweeping may be, and the greater the value of the candidate garbage sweeping point B may be. At moment $t_1$, the garbage truck may sweep at the candidate garbage sweeping point B. The value of the garbage truck going to the candidate garbage point C is also related to the pedestrian comfort degree at the current moment (i.e., $t_1$).

In some embodiments, the management platform may determine the pedestrian comfort degree at the current moment through the comfort degree prediction model. For more information about the comfort degree prediction model please refer to FIG. 7 and the related descriptions thereof.

In some embodiments of the present disclosure, linking the pedestrian comfort degree at the current moment to the value of the candidate garbage sweeping point, the value of the candidate garbage sweeping point can be made more convincing by taking full account of the improvement in pedestrian comfort brought by garbage sweeping.

In some embodiments, the value of the at least one candidate garbage sweeping point is also related to the predicted pedestrian flow at a future moment after sweeping of the at least one candidate garbage sweeping point.

The predicted pedestrian flow at the future moment after sweeping is a predicted pedestrian flow at the future moment after garbage sweeping. For example, the predicted pedestrian flow at the future moment after sweeping may be a pedestrian flow within 1 hour after garbage sweeping.

In some embodiments, the higher the predicted pedestrian flow at the future moment after sweeping is, the greater the value of that candidate garbage sweeping point may be. For example, 9:00 a.m. is a peak work period, and after the candidate garbage sweeping point D is swept at 8:00 a.m., the predicted pedestrian flow in the next hour is higher, and the value of the candidate garbage sweeping point D is higher at this time. The lunch break is at 1:00 p.m., after candidate garbage sweeping point D is cleared at 12:00 p.m., the predicted pedestrian flow in the next hour is low, and the value of the candidate garbage sweeping point is lower at this time.

In some embodiments of the present disclosure, by linking the predicted pedestrian flow at the future moment after sweeping to the value of the candidate garbage sweeping point, the change in pedestrian flow due to garbage sweeping can be fully taken into account and the value of sweeping the candidate garbage sweeping point can be better illustrated.

In some embodiments, the management platform may determine the predicted pedestrian flow at the future moment after sweeping through a pedestrian flow prediction model. The pedestrian flow prediction model may be a time series type machine learning model based on network structures, such as a recurrent neural network (RNN), a long short term memory network) (LSTN), etc.

In some embodiments, the input of the pedestrian flow prediction model may be the historical pedestrian flow on a certain road at the plurality of historical moments corresponding to the future moment, and the output of the pedestrian flow prediction model may be the predicted pedestrian flow on that road at the future moment after sweeping.

The parameters of the pedestrian flow prediction model may be obtained by training. In some embodiments, the pedestrian flow prediction model may be obtained by training the plurality of groups of pedestrian flow training samples with pedestrian flow labels. For example, the plurality of groups of pedestrian flow training samples with pedestrian flow labels may be input to the initial pedestrian flow prediction model, and the loss function is constructed based on the pedestrian flow labels and the output results of the initial pedestrian flow prediction model, and the parameters of the initial pedestrian flow prediction model are updated iteratively based on the loss function. The training of the model is completed when the loss function of the initial pedestrian flow prediction model meets the preset requirements, and a trained pedestrian flow prediction model is obtained. The preset requirements may be that the loss function converges, the count of iterations reaches a threshold, etc.

In some embodiments, each group of pedestrian flow training samples may include the plurality of historical moments of historical pedestrian flow on each sample road corresponding to the future moment. Each group of people flow labels may be the pedestrian flow after actual sweeping at the future moment corresponding to each group of pedestrian flow training samples. In some embodiments, the pedestrian flow training samples and pedestrian flow labels may be obtained directly from the historical database.

In some embodiments of the present disclosure, the predicted pedestrian flow at the future moment after sweeping can be predicted automatically through the pedestrian flow prediction model, which can make the predicted pedestrian flow at the future moment after sweeping more efficient.

In some embodiments, the management platform may perform random combinations of candidate garbage sweeping points to form a plurality of garbage sweeping schemes. The total garbage volume of the garbage to be processed in a randomly combined garbage sweeping scheme does not exceed the volume of the garbage truck. The management platform may use the garbage sweeping scheme with the highest total value of the plurality of candidate garbage sweeping points included in the plurality of garbage sweeping schemes as the preferred scheme. In some embodiments, the management platform may also determine a preferred scheme by performing steps 910-930.

Step 910, determining whether the garbage volume of the p-th candidate garbage sweeping point is not greater than a preset volume.

The preset volume is the preset volume of the garbage truck. The preset volume may be any value less than or equal to the remaining volume of the garbage truck. For example, the remaining volume of the garbage truck at the p-th candidate garbage sweeping point is 20 cubic meters, and the preset volume may be any value less than or equal to 20 cubic meters.

In some embodiments, the management platform may determine a preset volume based on a preset rule. The preset rule may be a predetermined rule in advance on how to determine the preset volume. For example, the preset rule may be to calculate the remaining volume of the garbage truck as a preset volume. Exemplarily, the preset volume may be denoted by W, $W=U-\Sigma w_x$, where U is the total available volume of the garbage truck and $\Sigma w_x$ is the sum of the garbage volume of the selected candidate garbage points from the q-th candidate garbage point to the (p+1)-th candidate garbage point.

In some embodiments, the management platform may determine whether the garbage volume of the p-th candidate garbage sweeping point is not less than the preset volume by making a difference. For example, a difference between the garbage volume of the p-th candidate garbage cleaning point and the preset volume is made, if the difference between the garbage volume of the p-th candidate garbage sweeping point and the preset volume is greater than or equal to 0, the garbage volume of the p-th candidate garbage sweeping point is not less than the preset volume, and if the difference is less than 0, then the garbage volume of the p-th candidate garbage sweeping point is less than the preset volume.

Step 920, in response to a p-th candidate garbage sweeping point having a garbage volume not greater than a preset volume, determining a preferred scheme corresponding to the first p candidate garbage sweeping points and a planning value of the preferred scheme based on a comparison of a first value and a second value.

The first value is the total value of the candidate garbage sweeping points in the preferred scheme excluding the p-th candidate garbage sweeping point. For example, when the current candidate garbage sweeping point is the 10th candidate garbage sweeping point, the first value is the value of the preferred scheme that does not include the 10th candidate garbage sweeping point, i.e., only the first 9 candidate garbage sweeping points are considered.

In some embodiments, the first value may be determined based on a preferred scheme that does not include the p-th candidate garbage sweeping point.

In some embodiments, the first value may be expressed in equation (4):

$$f_1 = f(p-1, W) \qquad (4).$$

Where f(p−1,W) is the value of the optimal solution of sweeping the p−1 candidate garbage sweeping points by the garbage truck under a condition of the available volume W (at this time, the available volume is the same as the preset volume).

In some embodiments, the management platform may determine a preferred scheme for the first p−1 candidate garbage sweeping points without sweeping the p-th candidate garbage sweeping point, and calculate the value of the preferred scheme as the first value $f_1$.

The second value is the total value of the candidate garbage sweeping point of the reference scheme of the first p−1 candidate garbage sweeping points and the p-th candidate garbage sweeping point, in the premise of sweeping the p-th candidate garbage sweeping point. For example, when the current candidate garbage sweeping point is the 10th candidate garbage sweeping point, the second value is the total value of the candidate garbage sweeping points in the reference scheme of the first p−1 candidate garbage sweeping points and the 10th candidate sweeping point.

In some embodiments, the second value may be determined based on the value impact of the p-th candidate garbage sweeping point and a reference scheme corresponding to the first p−1 candidate garbage sweeping points. The scheme volume of the reference scheme may be related to the garbage volume of the p-th candidate garbage sweeping point.

The reference scheme is a feasible scheme for garbage sweeping point selection from the (p−1)-th candidate garbage sweeping point to the 1st candidate garbage sweeping point. For example, the reference scheme is a garbage sweeping scheme with the largest value of the first p−1 candidate garbage sweeping points under a condition of the scheme volume.

The scheme volume is a remaining volume after sweeping the p-th candidate garbage sweeping point. For example, if the preset volume is 18 cubic meters and the p-th candidate garbage sweeping point has a garbage volume of 3 cubic meters, the scheme volume of the reference scheme is 15 cubic meters.

In some embodiments, the management platform may calculate the difference between the preset volume and the garbage volume of the p-th candidate garbage sweeping point and determine the difference as the scheme volume of the reference scheme.

In some embodiments, the second value may be expressed in equation (5):

$$f_2 = f(p-1, W - w_p) + v_p \qquad (5).$$

Where $f(p-1, W-w_p)$ is the maximum value that may be brought by the reference scheme of the garbage truck sweeping the first p−1 candidate garbage sweeping points under the condition that the available volume is $W-w_p$ (at this time, the available volume is equal to the preset volume minus the garbage volume of the p-th candidate garbage sweeping point), $w_p$ is the garbage volume of the p-th candidate garbage sweeping point, and $v_p$ is the value of sweeping the p-th candidate garbage sweeping point.

In some embodiments, the management platform may determine a reference scheme for the first p−1 candidate garbage sweeping points under a premise of sweeping the p-th candidate garbage sweeping point, and calculate the total value of the p-th candidate garbage sweeping point and the candidate garbage sweeping points in the reference scheme as the second value $f_2$.

The planning value is the total value of the target garbage sweeping points selected according to the preferred scheme. For example, the planning value may be a total revenue generated by sweeping all candidate garbage sweeping points in the preferred scheme.

In some embodiments, the management platform may compare the first value and the second value and use the greater value as the planning value. The planning value may be expressed by equation (6)

$$f(p,=\max(f_1, f_2) = \max(f(p-1, W) f(p-1, W-w_p) + v_p) \qquad (6).$$

Where $f(p-1,W)$ and $f(p-1,W-w_p)$ may be determined by performing steps 910-930 after judging the size relationship between the garbage volume of the (p−1)-th candidate garbage sweeping point and the corresponding preset volume/available volume. For example, when the garbage volume of the (p−1)-th candidate garbage sweeping point is not greater than the corresponding preset volume, $f(p-1,W) = \max(f(p-2, W_{p-1}), f(p-2, W_{p-1}-w_{p-2})+v_{p-1})$, where $W_{p-1}$ is the preset volume corresponding to the (p−1)-th candidate garbage sweeping point, $w_{p-2}$ is the garbage amount of the (p−2)-th candidate garbage sweeping point, and $v_{p-1}$ is the value of the p-th candidate garbage sweeping point. The management platform may perform a recursion according to the above manner until the planning value f(p,W) is determined. When the candidate garbage sweeping point is 0, the candidate garbage sweeping point whose preset volume or available volume does not exceed W or W−$w_p$ is selected from the 0 candidate garbage sweeping points, indicating that there is no corresponding candidate garbage sweeping point, and the value is 0 at this time. When the preset volume or available volume is 0, the candidate garbage sweeping point with the preset volume or available volume of 0 is selected from p candidate garbage sweeping points, indicating that there is no corresponding candidate garbage sweeping point, and the value is 0 at this time.

The management platform may determine the at least one candidate garbage sweeping point of the candidate scheme corresponding to the planning value as the at least one target garbage sweeping point.

Step 930, in response to the p-th candidate garbage sweeping point having a garbage volume greater than the preset volume, determining the preferred scheme corresponding to the first p candidate garbage sweeping points and the planning value of the preferred scheme based on the reference scheme corresponding to the first p−1 candidate garbage sweeping points.

In some embodiments, the management platform 130 may determine the maximum value f(p−1,W) corresponding to the first p−1 candidate garbage sweeping points under the condition of the available volume W (at this time, the available volume is equal to the preset volume), and use the maximum value as the planning value. The maximum value of the first p−1 candidate garbage sweeping points may be determined by performing steps 910-930 at p=p−1. For example, the relationship between the (p−1)-th candidate garbage point and the corresponding preset volume is determined; and when the garbage volume of the (p−1)-th candidate garbage sweeping point is not larger than the corresponding preset volume, the planning value is determined by performing a recursion on $f(p-1,W) = \max(f(p-2,W), f(p-2, W-w_{p-1})+v_{p-1})$ according to equation (6) and its associated description.

In some implementations of the present disclosure, the target garbage sweeping point is determined based on the preferred scheme, which can lead to more pedestrian comfort degree after garbage sweeping and increase the pedestrian flow on the road, thereby resulting in a significant improvement of the habitat.

It should be noted that the above description of the process 900 is for example and illustration purposes only and does not limit the scope of application of the present disclosure. For those skilled in the art, various amendments and changes can be made to process 900 under the guidance of the present disclosure. However, these amendments and changes are still within the scope of the present disclosure.

The basic concept has been described above. Obviously, for the technicians skilled in the arts, the above detailed disclosure is only used as an example, and does not constitute a limitation of the present disclosure. Although not explicitly described herein, various modifications, improvements, and corrections to this disclosure may occur to the technicians skilled in the art. Such modifications, improvements, and corrections are suggested in this disclosure and thereof remain within the spirit and scope of the exemplary embodiments of this disclosure.

Meanwhile, the present disclosure uses specific words to describe the embodiments of the present disclosure. As "one embodiment", "an embodiment", and/or "some embodiments" means a certain feature, structure, or characteristic of at least one embodiment of the present disclosure. Therefore, it should be emphasized and noted that two or more references to "an embodiment" or "one embodiment" or "an alternative embodiment" in various places in this specification are not necessarily referring to the same embodiment. In addition, some features, structures, or characteristics of one or more embodiments in this disclosure may be properly combined.

Furthermore, unless explicitly stated in the claims, the order of processing elements and sequences described in this disclosure, the use of alphanumerics, or the use of other names is not intended to limit the order of the processes and methods of this disclosure. While the foregoing disclosure discusses by way of various examples some embodiments of the invention presently believed to be useful, it is to be understood that such details are for purposes of illustration only and that the appended claims are not limited to the disclosed embodiments, but rather are intended to cover all modifications and equivalent combinations that fall within the essence and scope of the embodiments of this disclosure. For example, although the implementation of various components described above may be embodied in a hardware device, it may also be implemented as a software only scheme, e.g., an installation on an existing server or mobile device.

Similarly, it should be noted that, in order to simplify the expressions disclosed in this disclosure and thus help the understanding of one or more embodiments of the invention, in the foregoing description of the embodiments of this disclosure, various features may sometimes be combined into one embodiment, in the drawings or descriptions thereof. However, this method of disclosure does not imply that the subject matter of the disclosure requires more features than are recited in the claims. Rather, claimed subject matter may lie in less than all features of a single foregoing disclosed embodiment.

Some examples use numbers to describe quantities of ingredients and attributes, it should be understood that such numbers used to describe the examples, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the specification and claims are approximations that can vary depending upon the desired characteristics of individual embodiments. In some embodiments, the numerical parameters should take into account the specified significant digits and use a general digit reservation method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents are hereby incorporated into this disclosure for reference. Application history documents that are inconsistent with or conflict with the contents of this disclosure are excluded, as are documents (currently or hereafter appended to this disclosure) limiting the broadest scope of the claims of this disclosure. It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only used to illustrate the principles of the embodiments of this disclosure. Other variants may also belong to the scope of this disclosure. Accordingly, by way of example and not limitation, alternative configurations of the embodiments of this disclosure may be considered consistent with the instruction of this disclosure. Accordingly, the embodiments of this disclosure are not limited to those expressly introduced and described in this disclosure.

What is claimed is:

1. An Internet of Things system for determining a garbage sweeping point in a smart city, comprising a user platform, a service platform, a management platform, a sensor network platform, and an object platform;

the service platform used to send at least one target garbage sweeping point to the user platform;

the object platform used to obtain monitoring information on at least one road within a road network area and transmit the monitoring information to the management platform via the sensor network platform; and the management platform used to:

obtain the monitoring information on the at least one road within the road network area, identifying a target object on the at least one road, wherein the target object includes at least garbage to be processed;

determine, based on an identification result, information related to the target object, wherein the information related to the target object includes at least a garbage volume of the garbage to be processed;

determine the at least one target garbage sweeping point based on the information related to the target object, wherein to determine the at least one target garbage sweeping point based on the information related to the target object, the management platform is further used to:

determine the at least one road with the garbage volume meeting a predetermined condition as at least one candidate garbage sweeping point; and determine the at least one target garbage sweeping point based on the at least one candidate garbage sweeping point, wherein to determine the at least one target garbage sweeping point based on the at least one candidate garbage sweeping point, the management platform is further used to:

determine the at least one candidate garbage sweeping point in a preferred scheme corresponding to first p candidate garbage sweeping points as the at least one target garbage sweeping point, wherein determining the preferred scheme corresponding to the first p candidate garbage sweeping points includes:

determining, in response to a p-th candidate garbage sweeping point having a garbage volume not greater than a preset volume, the preferred scheme corresponding to the first p candidate garbage sweeping points and a planning value of the preferred scheme based on a comparison of a first value and a second value, wherein the first value is determined based on a preferred scheme excluding the p-th candidate garbage sweeping point, the second value is determined based on an influence of a value of the p-th candidate garbage sweeping point and a reference scheme corresponding to first p−1 candidate garbage sweeping points, and a scheme volume of the reference scheme is related to the garbage volume of the p-th candidate garbage sweeping point; and determining, in response to the p-th candidate garbage sweeping point having a garbage volume greater than the preset volume, the preferred scheme corresponding to the first p candidate garbage sweeping points and the planning value of the preferred scheme based on the reference scheme corresponding to the first p−1 candidate garbage sweeping points;

generate a remote control instruction and send the remote control instruction to the sensor network platform based on the at least one target garbage sweeping point; and send the remote control instruction to the object platform based on the sensor network platform to cause the object platform to perform a sweeping operation.

2. The Internet of Things system of claim 1, wherein the target object further includes a pedestrian, the information related to the target object further includes a pedestrian flow; and the management platform is further used to:

determine a pedestrian change based on pedestrian information and determine the pedestrian flow based on the pedestrian change, wherein the pedestrian information is an identification result obtained by identifying a single-frame image and the pedestrian change is an identification result obtained by identifying a plurality of single-frame images.

3. The Internet of Things system of claim 2, wherein the information related to the target object further includes a first pedestrian comfort degree on each road of the at least one road, wherein the first pedestrian comfort degree refers to a comfort degree of the pedestrian while passing through the road, and the first pedestrian comfort degree relates to the garbage to be processed; and the management platform is further used to:

determine the first pedestrian comfort degree based on a travel speed of the pedestrian passing through a garbage gathering point on the each road and a dwell time of the pedestrian on the each road.

4. The Internet of Things system of claim 2, wherein the information related to the target object further includes a second pedestrian comfort degree on each road of the at least one road at a future moment, wherein the second pedestrian comfort degree refers to a comfort degree of the pedestrian while passing through the road, and the second pedestrian comfort degree relates to the garbage to be processed; and the management platform is further used to:

predict the second pedestrian comfort degree by using a comfort degree prediction model based on historical pedestrian comfort degrees on the each road at a plurality of historical moments, wherein the comfort degree prediction model is a machine learning model.

5. The Internet of things system of claim 1, wherein the management platform is further used to:

obtain a garbage growth rate for each of the at least one candidate garbage sweeping point, wherein the garbage growth rate refers to the garbage volume of the garbage to be processed that grows per unit time; and determine the at least one target garbage sweeping point based on the garbage growth rate.

6. The Internet of Things system of claim 5, wherein the garbage growth rate is related to a pedestrian flow on a road corresponding to the garbage growth rate.

* * * * *